United States Patent
Page

(10) Patent No.: US 7,555,016 B2
(45) Date of Patent: *Jun. 30, 2009

(54) DATA COMMUNICATION

(75) Inventor: Michael Page, Oxford (GB)

(73) Assignee: Sony United Kingdom Limited, Weybridge (GB)

( * ) Notice: Subject to any disclaimer, the term of this patent is extended or adjusted under 35 U.S.C. 154(b) by 835 days.

This patent is subject to a terminal disclaimer.

(21) Appl. No.: 10/513,831

(22) PCT Filed: Mar. 21, 2003

(86) PCT No.: PCT/GB03/01101

§ 371 (c)(1),
(2), (4) Date: Nov. 8, 2004

(87) PCT Pub. No.: WO03/096638

PCT Pub. Date: Nov. 20, 2003

(65) Prior Publication Data

US 2005/0213693 A1    Sep. 29, 2005

(30) Foreign Application Priority Data

May 9, 2002    (GB) .................................. 0210658.1

(51) Int. Cl.
*H04J 3/06* (2006.01)
*H04L 12/56* (2006.01)
*H04L 7/00* (2006.01)

(52) U.S. Cl. .................... 370/509; 370/395.62; 375/354

(58) Field of Classification Search .................. 370/498, 370/503, 509–510, 512–514; 375/354–356, 375/365

See application file for complete search history.

(56) References Cited

U.S. PATENT DOCUMENTS 4,691,294 A    9/1987    Humpleman (Continued)

FOREIGN PATENT DOCUMENTS

EP    0 051 332    5/1982

(Continued)

OTHER PUBLICATIONS

Page, Michael, "MAC-DSD Multi-channel Audio Connection for DSD", Sony BPRL, Version 1.1, Nov. 1, 2002-2004, pp. 4-23.*

*Primary Examiner*—Tri H Phan
(74) *Attorney, Agent, or Firm*—Oblon, Spivak, McClelland, Maier & Neustadt, P.C.

(57) ABSTRACT

A data communication system for communicating an input streamed data signal having an associated clock signal including at least two data handling nodes each having a physical layer interface device and a balanced line interface device, a transmitting one of the data handling nodes being arranged to transmit the input data signal to a receiving one of the data handling nodes; and a twisted-pair wired connection linking the data handling nodes, the wired connection comprising a cable providing at least two parallel data transmission paths between the data handling nodes; in which: at the transmitting node, the input data signal is supplied to the physical layer interface device for packeted transmission via one data transmission path of the wired connection to the receiving node; and the clock signal associated with the input data signal is supplied to the balanced line interface device for substantially continuous transmission via another of the data transmission paths to the receiving node; and at the receiving node, the received clock signal is supplied to the balanced line interface device for recovery and the packeted data signal is supplied to the physical layer interface device for conversion back to a streamed data signal.

45 Claims, 26 Drawing Sheets

U.S. PATENT DOCUMENTS

| | | |
|---|---|---|
| 5,307,345 A | 4/1994 | Lozowick et al. |
| 5,452,436 A | 9/1995 | Arai et al. |
| 5,590,130 A | 12/1996 | Krein et al. |
| 5,598,581 A | 1/1997 | Daines et al. |
| 5,835,751 A | 11/1998 | Chen et al. |
| 5,920,897 A | 7/1999 | Jin et al. |
| 6,091,707 A | 7/2000 | Egbert et al. |
| 6,138,189 A | 10/2000 | Kalkunte |
| 6,233,243 B1 | 5/2001 | Ganmukhi et al. |
| 6,363,432 B1 | 3/2002 | Laber |
| 2001/0043603 A1 | 11/2001 | Yu |

FOREIGN PATENT DOCUMENTS

| | | |
|---|---|---|
| EP | 0 577 115 | 1/1994 |
| EP | 0 772 326 | 5/1997 |
| EP | 1 124 355 | 8/2001 |
| EP | 1 241 844 | 9/2002 |
| JP | 3-157030 | 7/1991 |
| JP | 06-152627 | 5/1994 |
| WO | WO 97/21310 | 6/1997 |
| WO | WO 98/43379 | 10/1998 |
| WO | WO 01/78297 | 10/2001 |
| WO | WO 02/49275 | 6/2002 |

* cited by examiner

| PRE-AMBLE | DEST. MAC ADDRESS | SOURCE MAC ADDRESS | DATA LENGTH | NETWOR-KING HEADERS | RESER-VED FIELD | FRAME TYPE | AUDIO DATA PAYLOAD | CRC |
|---|---|---|---|---|---|---|---|---|
| 8 Bytes | 6 Bytes | 6 Bytes | 2 Bytes | 28 Bytes | 12 Bitss | 4 Bits | 1480 Bytes | 4 Bytes |

AUDIO DATA FRAME

FIGURE 17

AUDIO DATA FRAME

| Word | B31-B28 | B27-B24 | B23-B20 | B19-B16 | B15-B12 | B11-B8 | B7-B4 | B3-B0 |
|---|---|---|---|---|---|---|---|---|
| 0 | 5h | 5h | 5h | 5h | 5h | 5h | 5h | 5h |
| 1 | Dh | 5h | 5h | 5h | 5h | 5h | 5h | 5h |
| 2 | Reserved for destination MAC address ||||||||
| 3 | Reserved for source MAC address |||| Reserved for dest. MAC address ||||
| 4 | Reserved for source MAC address ||||||||
| 5 | Length - always 1510 bytes (0x5E6) ||||||||
| 6 | Reserved for networking headers ||||||||
| 7 |  ||||||||
| 8 |  ||||||||
| 9 |  ||||||||
| 10 |  ||||||||
| 11 |  ||||||||
| 12 | reserved | reserved | reserved | frame type ||||
| 13-382 | 370 samples 32-channel DSD audio ||||||||
| 383 | CRC ||||||||

FIGURE 18A

| Word | B31-B28 | B27-B24 | B23-B20 | B19-B16 | B15-B12 | B11-B8 | B7-B4 | B3-B0 |
|---|---|---|---|---|---|---|---|---|
| 0 | 5h | 5h | 5h | 5h | 5h | 5h | 5h | 5h |
| 1 | Dh | 5h | 5h | 5h | 5h | 5h | 5h | 5h |
| 2 | Reserved for destination MAC address | | | | | | | |
| 3 | Reserved for source MAC address | | | | Reserved for destination MAC address | | | |
| 4 | Reserved for source MAC address | | | | | | | |
| 5 | IP Type-of-Service | IP Hdr Lnth | IP Version | Length – 1446 bytes (0x05A6) | | | | |
| 6 | IP Datagram ID | | | | IP Datagram Length | | | |
| 7 | IP Protocol | IP TTL | IP Fragment Offset | | | | IP Flgs | |
| 8 | Source IP Address (low 16) | | | | IP Header Checksum | | | |
| 9 | Destination IP Address (low 16) | | | | Source IP Address (high 16) | | | |
| 10 | IP Options (low 16) | | | | Destination IP Address (high 16) | | | |
| 11 | UDP Source Port | | | | IP Header Padding | | IP Options (high 8) | |
| 12 | UDP Length | | | | UDP Destination Port | | | |
| 13 | Frame format ID (0) | | | | UDP Checksum | | | |
| 14 | Frame format ID (2) | | | | Frame format ID (1) | | | |
| 15-366 | 1408-byte frame payload (352 DSD samples, 24 channels, plus 88 bytes aux data) | | | | | | | |
| 367 | CRC | | | | | | | |

Fig 18B

CONTROL DATA FRAME

| Word | B31-B28 | B27-B24 | B23-B20 | B19-B16 | B15-B12 | B11-B8 | B7-B4 | B3-B0 |
|------|---------|---------|---------|---------|---------|--------|-------|-------|
| 0 | 5h | 5h | 5h | 5h | 5h | 5h | 5h | 5h |
| 1 | Dh | 5h | 5h | 5h | 5h | 5h | 5h | 5h |
| 2 | Reserved for destination MAC address | | | | | | | |
| 3 | Reserved for source MAC address | | | | Reserved for dest. MAC address | | | |
| 4 | Reserved for source MAC address | | | | | | | |
| 5 | | | | | | | Length | |
| 6–11 | Reserved for networking headers | | | | | | | |
| 12 | | | | | reserved | reserved | reserved | frame type |
| 13–24 | 48 bytes control data (of arbitrary format) | | | | | | | |
| 25 | CRC | | | | | | | |

FIGURE 19

| Bits 15:12 | Bits 11:8 | Bits 7:4 | Bits 3:0 |
|---|---|---|---|
| Flags | Frame Type | Protocol Major Ver. | Protocol Minor Ver. |

Fig. 20

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| P5 | P4 | P3 | A1 | P2 | A0 | 24 | 23 | P1 | 22 | 21 | 20 | 19 | 18 | 17 | 16 | P0 | 15 | 14 | 13 | 12 | 11 | 10 | 9 | 8 | 7 | 6 | 5 | 4 | 3 | 2 | 1 |

| Parity bit | Data block elements XNOR'd to generate parity bit | | | | | | | | | | | | | | |
|---|---|---|---|---|---|---|---|---|---|---|---|---|---|---|---|
| P0 | 1 | 2 | 3 | 4 | 5 | 6 | 7 | 8 | 9 | 10 | 11 | 12 | 13 | 14 | 15 |
| P1 | 1 | 2 | 3 | 4 | 5 | 6 | 7 | 8 | 16 | 17 | 18 | 19 | 20 | 21 | 22 |
| P2 | 1 | 2 | 3 | 4 | 9 | 10 | 11 | 12 | 16 | 17 | 18 | 19 | 23 | 24 | A0 |
| P3 | 1 | 2 | 5 | 6 | 9 | 10 | 13 | 14 | 16 | 17 | 20 | 21 | 23 | 24 | A1 |
| P4 | 1 | 3 | 5 | 7 | 9 | 11 | 13 | 15 | 16 | 18 | 20 | 22 | 23 | A0 | A1 |
| P5 | (all elements – global parity bit) | | | | | | | | | | | | | | |

FIGURE 23B

| Syndrome bit | Data block elements XOR'd to generate syndrome bit | | | | | | | | | | | | | | | |
|---|---|---|---|---|---|---|---|---|---|---|---|---|---|---|---|---|
| s0 | 1 | 2 | 3 | 4 | 5 | 6 | 7 | 8 | 9 | 10 | 11 | 12 | 13 | 14 | 15 | P0 |
| s1 | 1 | 2 | 3 | 4 | 5 | 6 | 7 | 8 | 16 | 17 | 18 | 19 | 20 | 21 | 22 | P1 |
| s2 | 1 | 2 | 3 | 4 | 9 | 10 | 11 | 12 | 16 | 17 | 18 | 19 | 23 | 24 | A0 | P2 |
| s3 | 1 | 2 | 5 | 6 | 9 | 10 | 13 | 14 | 16 | 17 | 20 | 21 | 23 | 24 | A1 | P3 |
| s4 | 1 | 3 | 5 | 7 | 9 | 11 | 13 | 15 | 16 | 18 | 20 | 22 | 23 | A0 | A1 | P4 |
| s5 | (all elements including parity bits) | | | | | | | | | | | | | | | |

| Nibble | Bit 3 | Bit 2 | Bit 1 | Bit 0 |
|---|---|---|---|---|
| 0 | B3[0] | B2[0] | B1[0] | B0[0] |
| 1 | B7[0] | B6[0] | B5[0] | B4[0] |
| 2 | B11[0] | B10[0] | B9[0] | B8[0] |
| ... | ... | ... | ... | ... |
| 7 | B31[0] | B30[0] | B29[0] | B28[0] |
| 8 | B3[1] | B2[1] | B1[1] | B0[1] |
| 9 | B7[1] | B6[1] | B5[1] | B4[1] |
| ... | ... | ... | ... | ... |
| 254 | B27[31] | B26[31] | B25[31] | B24[31] |
| 255 | B31[31] | B30[31] | B29[31] | B28[31] |
| 256 | B35[0] | B34[0] | B33[0] | B32[0] |
| 257 | B39[0] | B38[0] | B37[0] | B36[0] |
| ... | ... | ... | ... | ... |
| 2814 | B347[31] | B346[31] | B345[31] | B344[31] |
| 2815 | B351[31] | B350[31] | B349[31] | B348[31] |

Fig 24

DATA COMMUNICATION

This invention relates to data communication.

An example of a problem in data communication will be described in the context of communicating so-called Direct Stream Digital audio data. However, the present invention is applicable to other types of clocked data, such as multi-bit audio data or video data.

Direct Stream Digital (DSD) is a high-resolution single-bit audio coding system used for the so-called Super Audio CD consumer disc format. DSD was developed with a view to producing audio signals comparable to those reproduced from the best analogue formats. DSD signals can produce a frequency response from DC to 100 kHz and have a dynamic range of greater than 120 dB across the audio band.

DSD makes use of 1-bit digital audio. 1-bit oversampling converters exploit a law of information theory whereby sample width can be traded off against sampling rate to effect conversion at a given resolution. For example a 1-bit converter that oversamples at 16 times the stored sample rate can give results which are equivalent to those obtainable with a 16 bit converter with no oversampling. 1-bit oversampling converters (also known as Sigma-Delta, noise shaping or bit stream converters) measure the difference between successive audio samples rather than representing the actual value of the waveform amplitude. In DSD a significant improvement in reproduced sound quality is achieved by recording a high frequency ($64F_s$) 1-bit signal directly onto a super-audio CD rather than recording a 16-bit signal at frequency $F_s$ onto a CD using pulse code modulation.

DSD systems require a high frequency audio sample clock at 64Fs=2.8224 MHz whereas the sample clock of standard PCM systems (Fs) is 44.1 kHz. This high frequency sample clock is transmitted along with the data to facilitate accurate signal reconstruction at the receiving end. Furthermore each channel of 64Fs DSD audio requires a transmission bandwidth of 2.8224 Mbit/s. It is a problem to provide interconnections between large-scale multi-track production equipment for DSD audio such as multi-channel ADC/DACs, DSD mixers and multi-channel DSD recorders both because of the high audio bandwidth required for the audio data interconnection and because of the difficulty of transmitting the high frequency (64Fs) audio sample clock between devices without compromising the integrity of the signal e.g. due to electromagnetic interference from the audio data signal.

Several known audio networking systems make use of Ethernet to transmit high bandwidth audio-data between a network of audio processing devices. For example the "Magic" system proprietary to Gibson makes use of the Ethernet Media Access Control MAC layer (i.e. physical layer and data link layer) to transmit audio data at a fixed audio sampling frequency of 48 kHz using one Ethernet frame per sample period. The CobraNet audio networking system proprietary to Peak Audio also uses the Ethernet MAC layer to transmit uncompressed digital audio data between networked devices. The CobraNet system uses a 48 kHz sampling rate and allows for transmission of 20-bit and 24-bit audio data. However, none of these known systems provides an interconnection suitable for linking DSD audio devices. This is because Ethernet frame timing is completely unsuitable for transmitting a 2.8224 MHz DSD sample clock.

This invention provides a data communication system for communicating an input streamed data signal having an associated clock signal, the system comprising:

at least two data handling nodes each having a physical layer interface device and a balanced line interface device, a transmitting one of the data handling nodes being arranged to transmit the input data signal to a receiving one of the data handling nodes; and a twisted-pair wired connection linking the data handling nodes, the wired connection comprising a cable providing at least two parallel data transmission paths between the data handling nodes;

in which:

at the transmitting node, the input data signal is supplied to the physical layer interface device for packeted transmission via one data transmission path of the wired connection to the receiving node; and the clock signal associated with the input data signal is supplied to the balanced line interface device for substantially continuous transmission via another of the data transmission paths to the receiving node; and at the receiving node, the received clock signal is supplied to the balanced line interface device for recovery and the packeted data signal is supplied to the physical layer interface device for conversion back to a streamed data signal.

The present invention use the physical layer of a link (e.g. an Ethernet link) to provide a data communication system for transmission of clocked digital data such as DSD data. The advantages of using the physical layer of Ethernet for such data transmission are that it offers a large bandwidth, has proven electromagnetic compatibility and has error detection functionality (cyclic redundancy checks) already in place. Use of the physical layer makes the logic easy to design and implement. There is no need to be concerned with hardware addressing and implementation of windowing protocols as would likely be required if the audio data were encoded using higher layer (e.g. MAC layer) technology. Furthermore at the physical layer level, Ethernet data transmission is robust and spectrum controlled so that electromagnetic emissions are low.

This invention also provides a data communication system for communicating an input streamed data signal having an associated data clock signal, the system comprising:

at least two data handling nodes each having a physical layer interface device operating in dependence on an interface clock signal, a transmitting one of the data handling nodes being arranged to transmit the input data signal to a receiving one of the data handling nodes; and a wired connection linking the data handling nodes, the wired connection comprising a cable providing at least two parallel data transmission paths between the data handling nodes;

in which:

the data handling nodes comprise means for generating an interface clock signal in dependence on the data clock signal and for supplying the interface clock signal to the respective physical layer interface device;

at the transmitting node, the input data signal is supplied to the physical layer interface device for packeted transmission via one data transmission path of the wired connection to the receiving node; and the clock signal associated with the input data signal is substantially continuously transmitted via another of the data transmission paths to the receiving node.

By operating the physical layer interface at a clock rate derived from the data rate, this aspect of the invention can potentially reduce degradation of the transmitted clock signal, but this is at the expense of removing compatibility with the symbol rate of standard Ethernet systems.

Various other respective aspects and features of the invention are defined in the appended claims. Features from the dependent claims may be combined with features of the independent claims as appropriate and not merely as explicitly set out in the claims.

Embodiments of the invention will now be described with reference to the accompanying drawings, throughout which like parts are referred to by like references, and in which.

Figure 3:
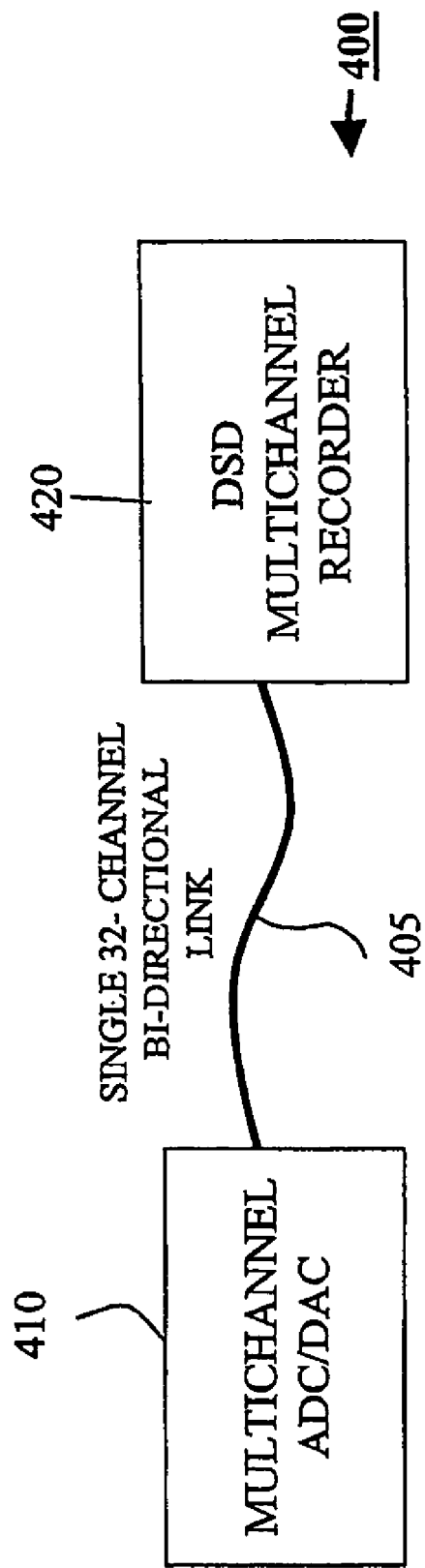
Figure 4:
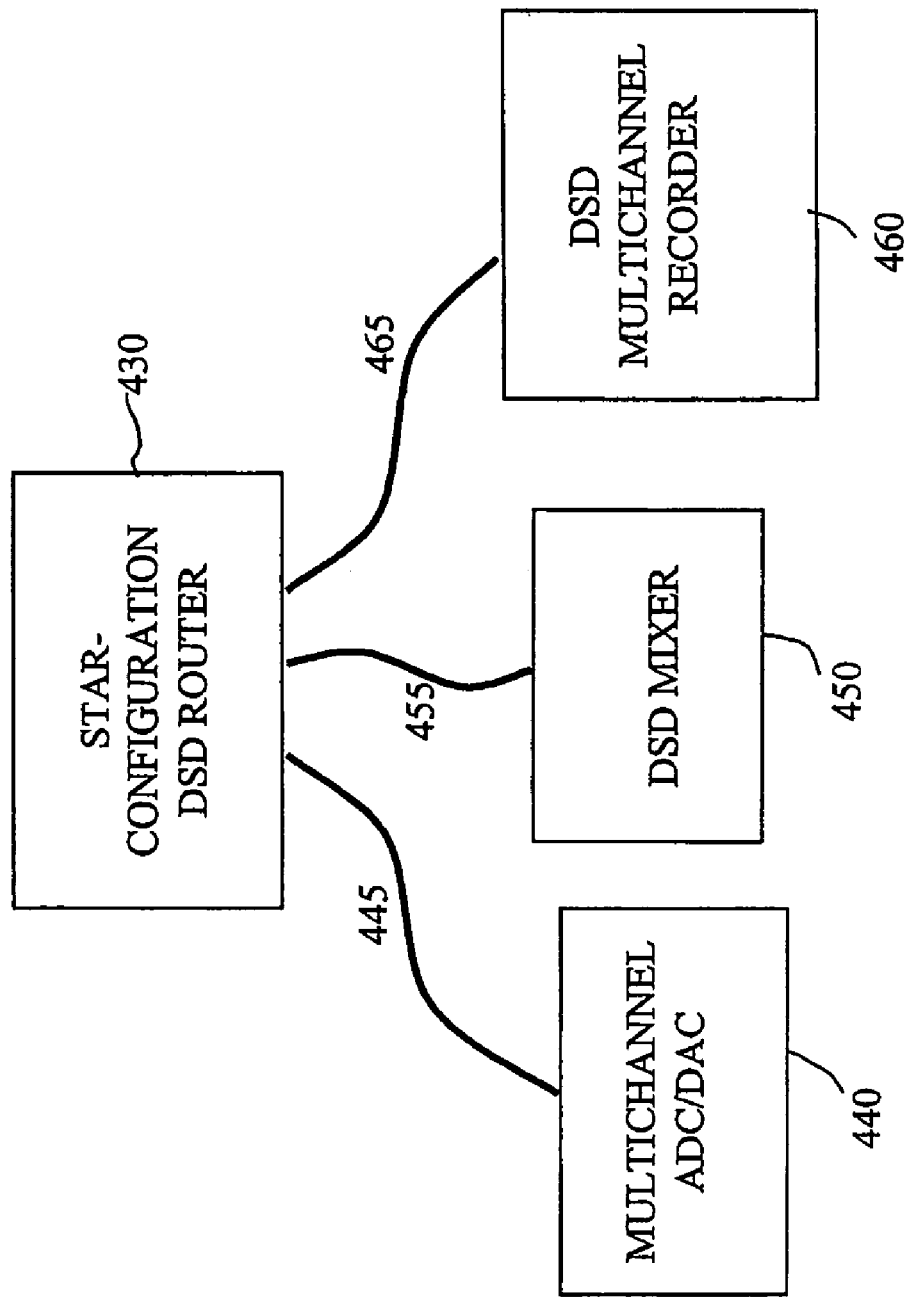
Figure 5:
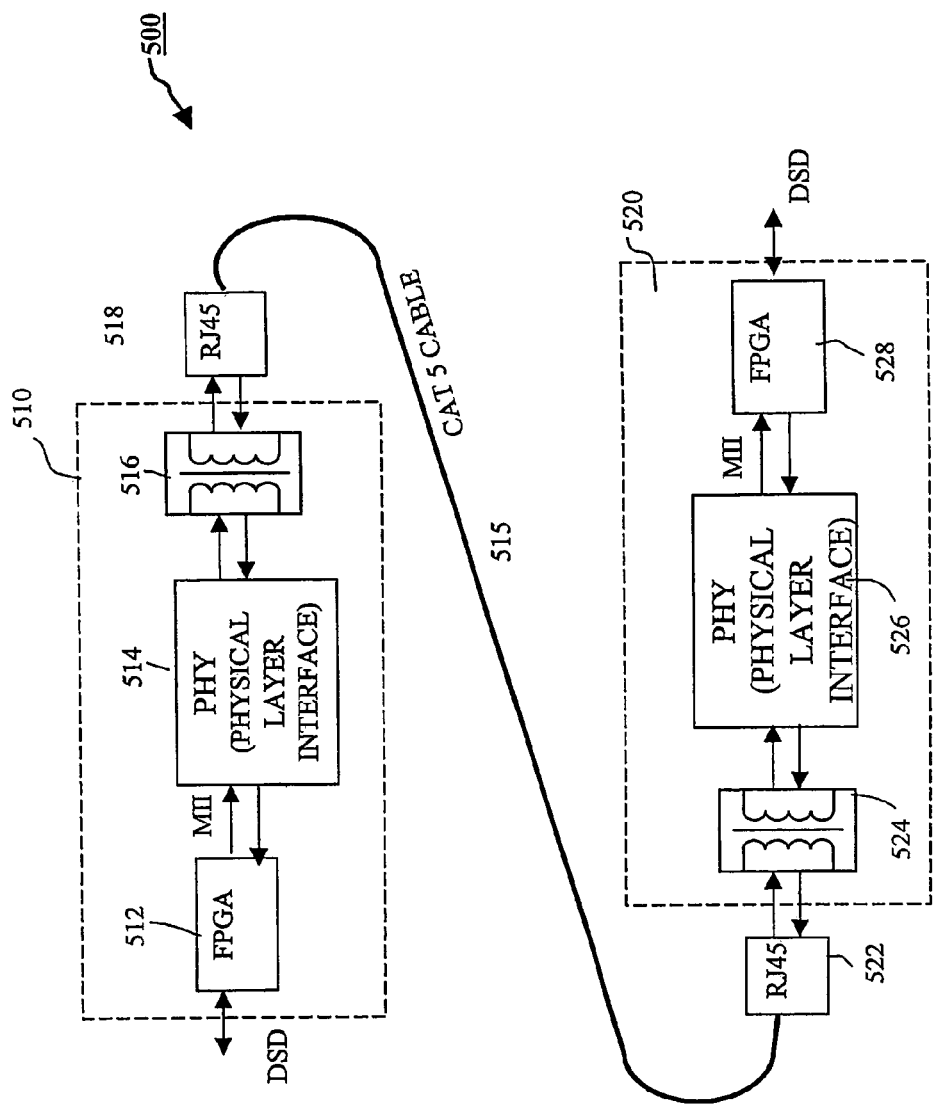
Figure 6:
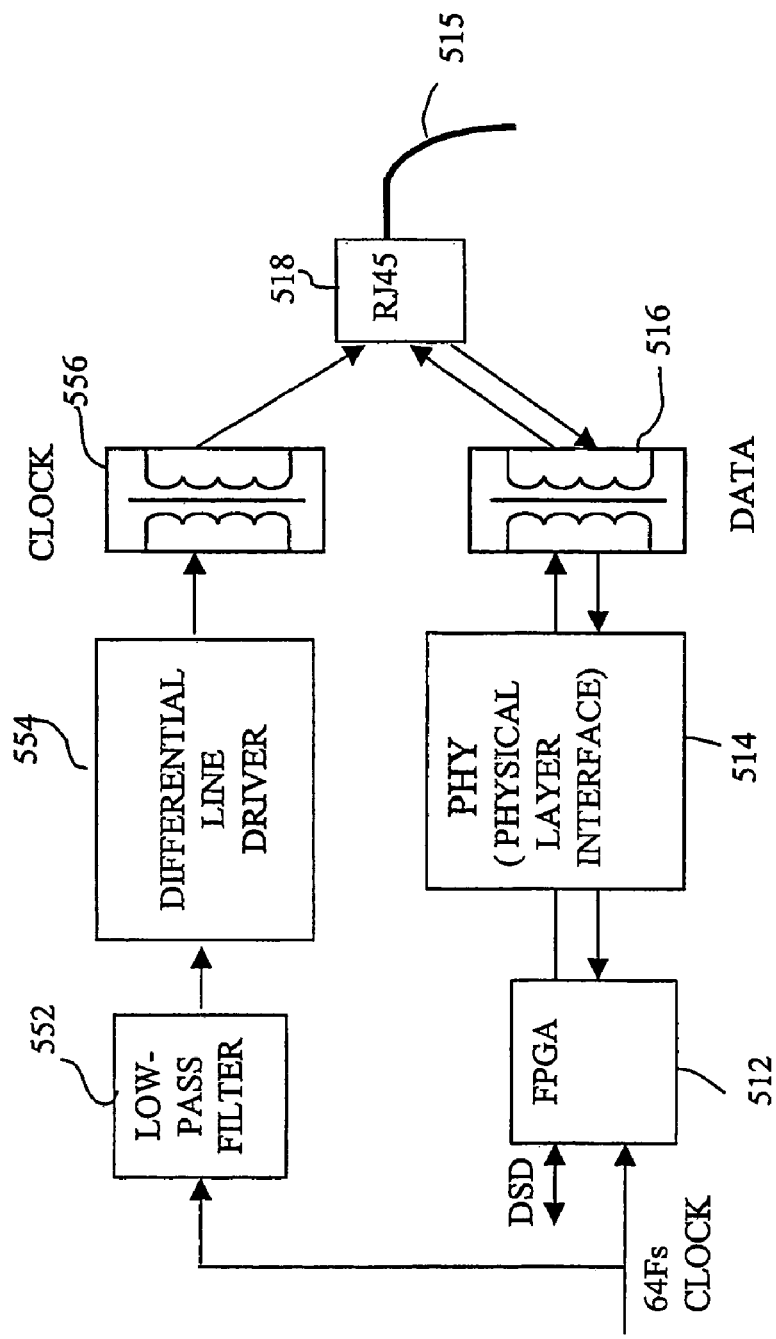
Figure 7:
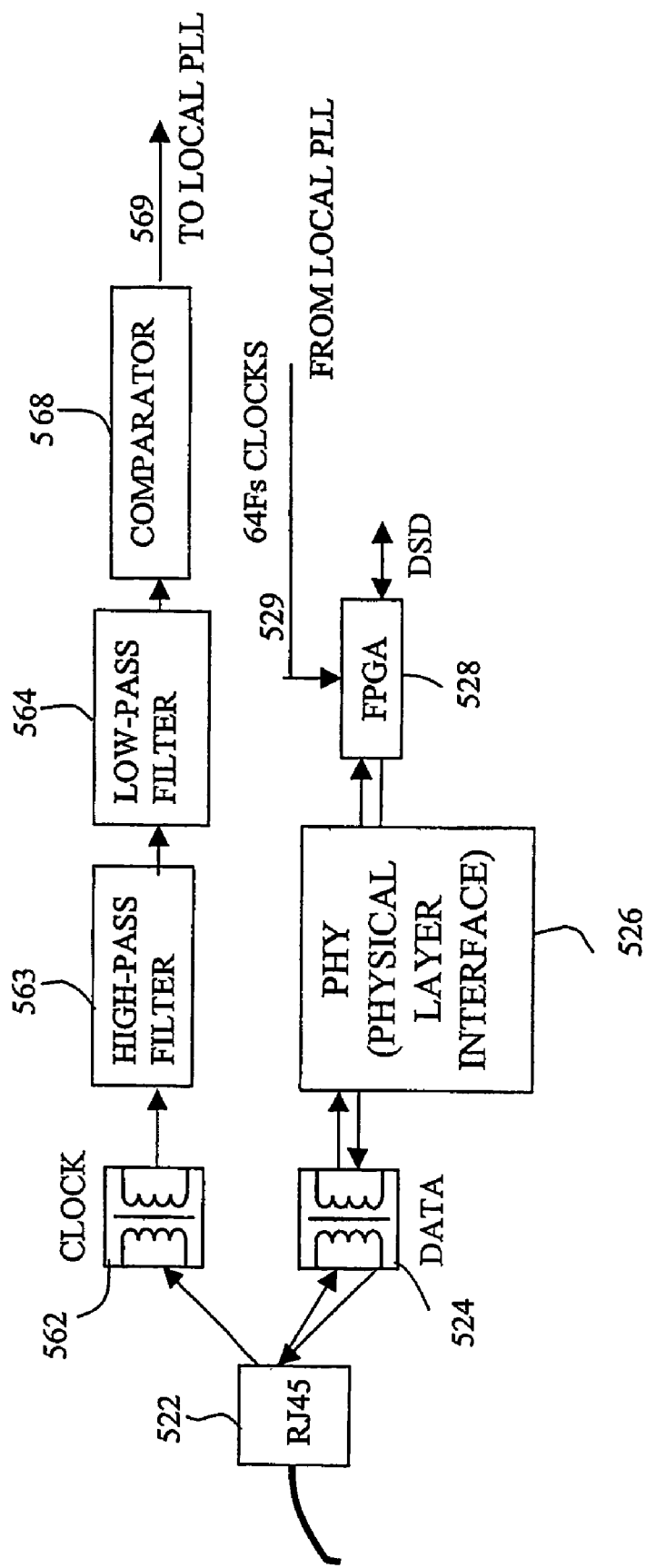
Figure 8:
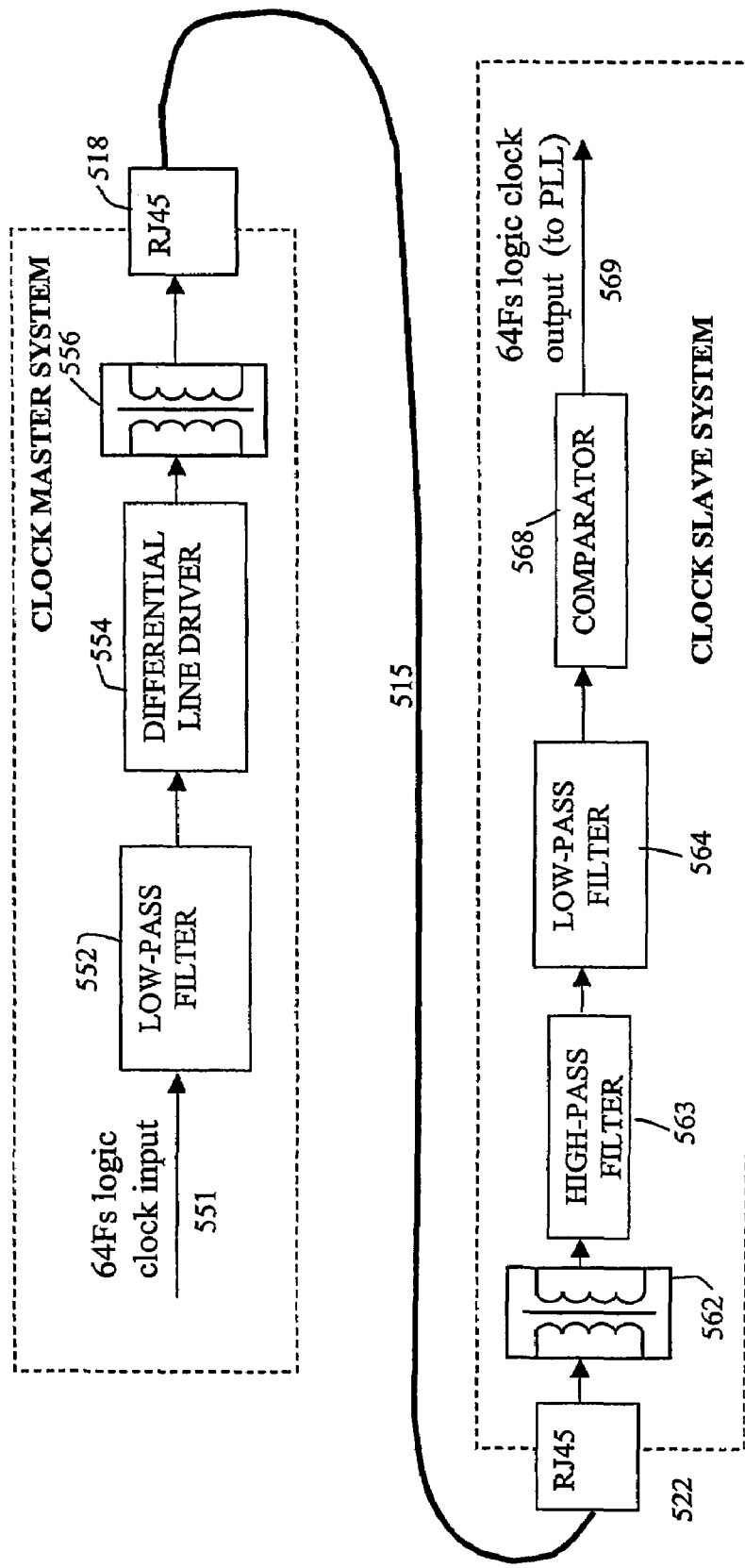
Figure 9:
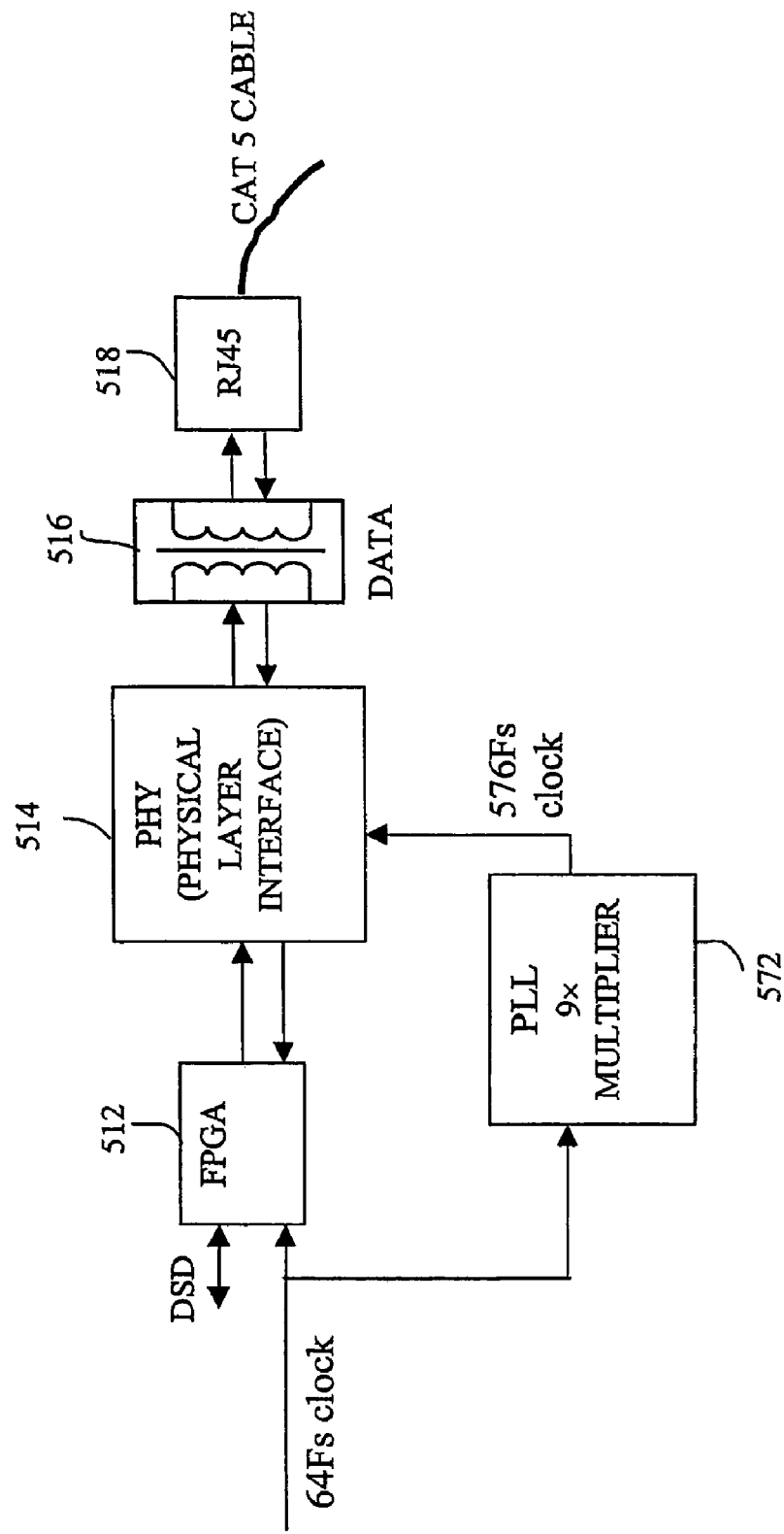
Figure 10:
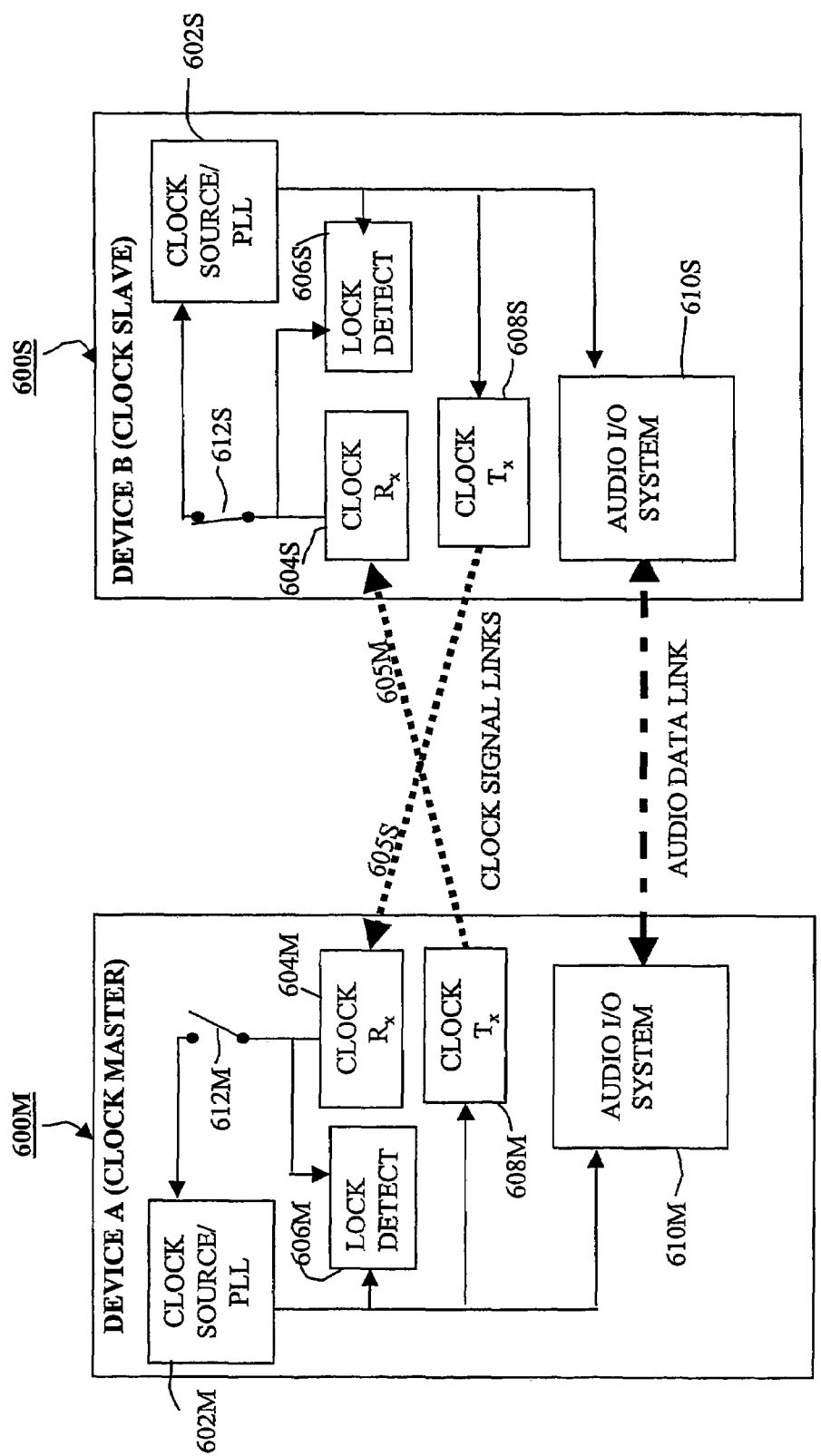
Figure 11:
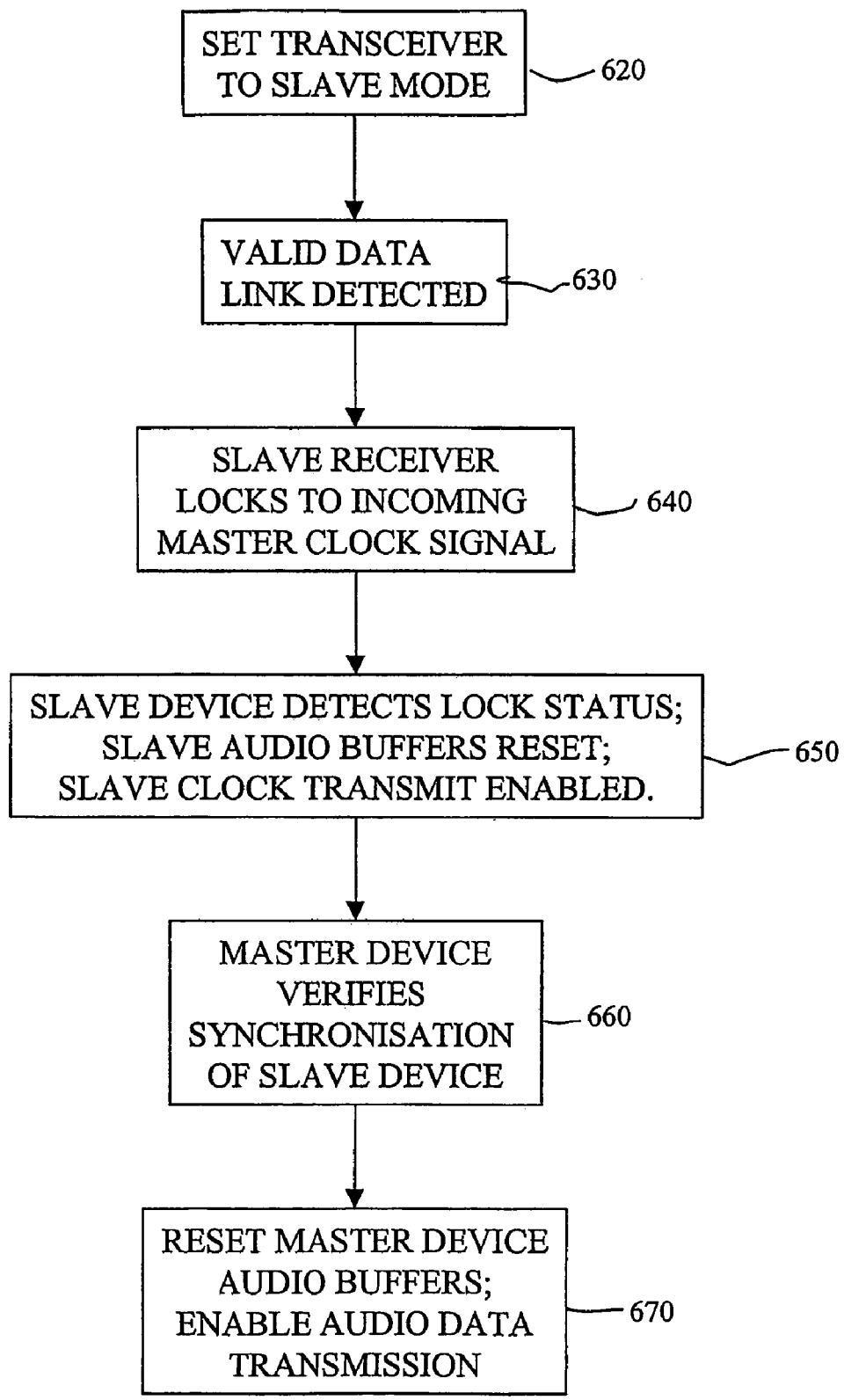
Figure 12:
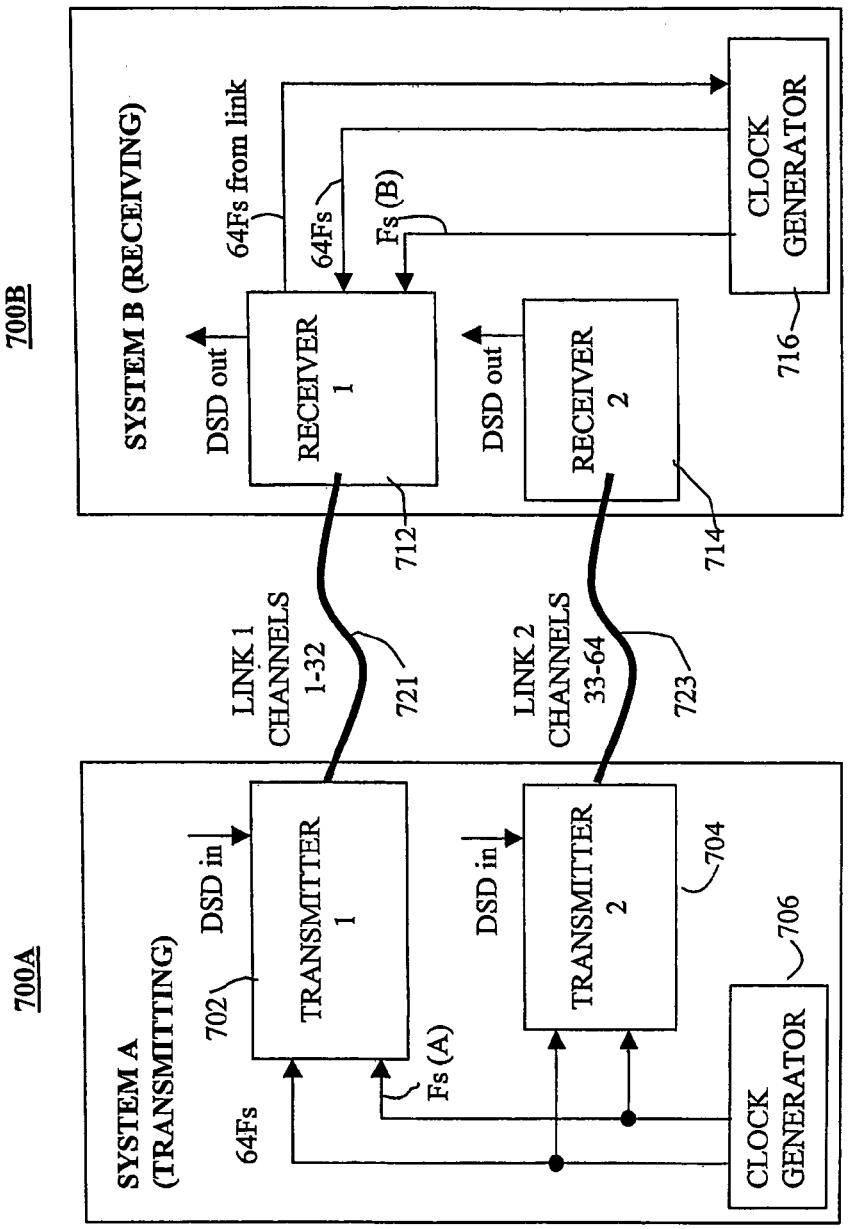
Figure 13:
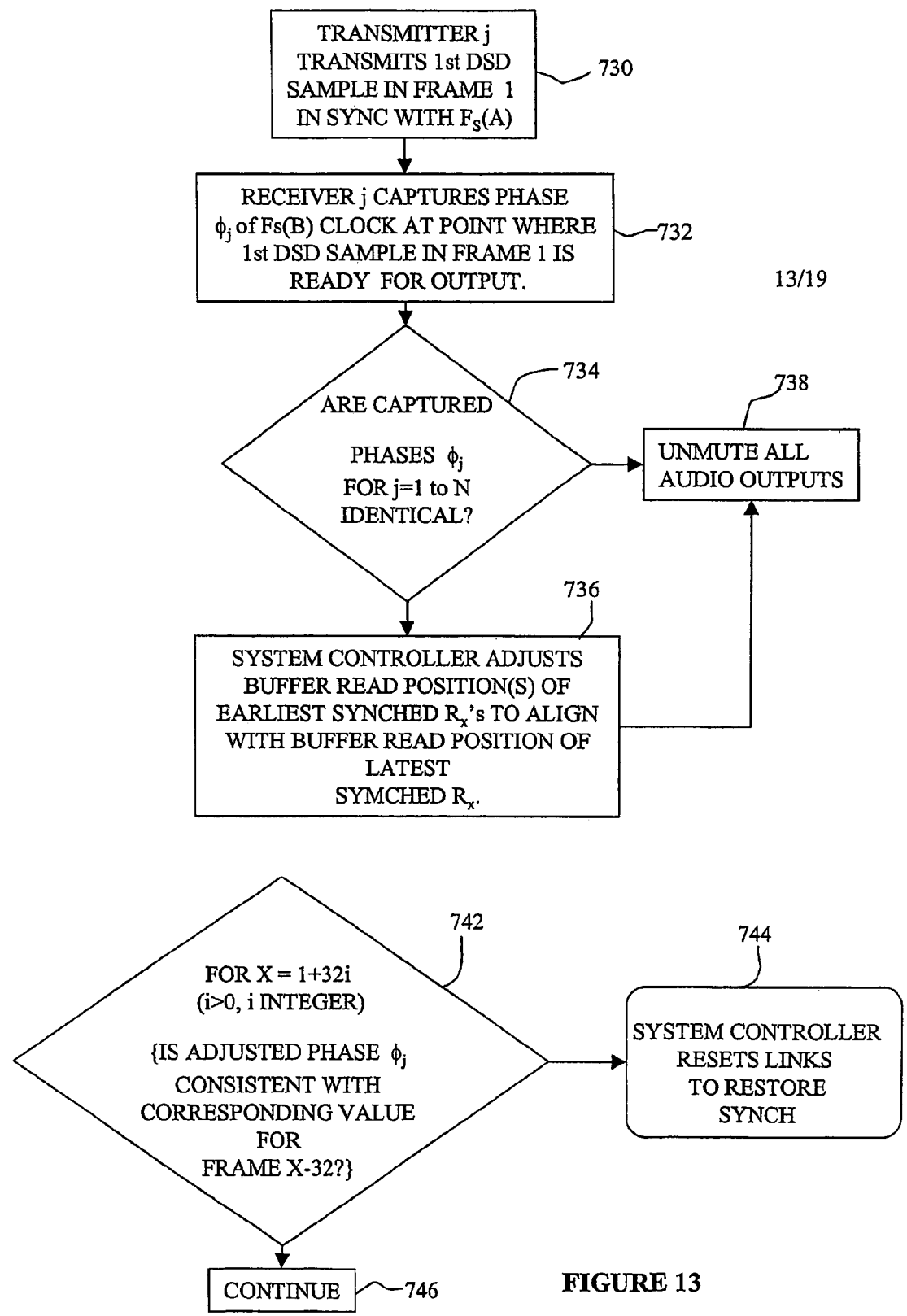
Figure 14:
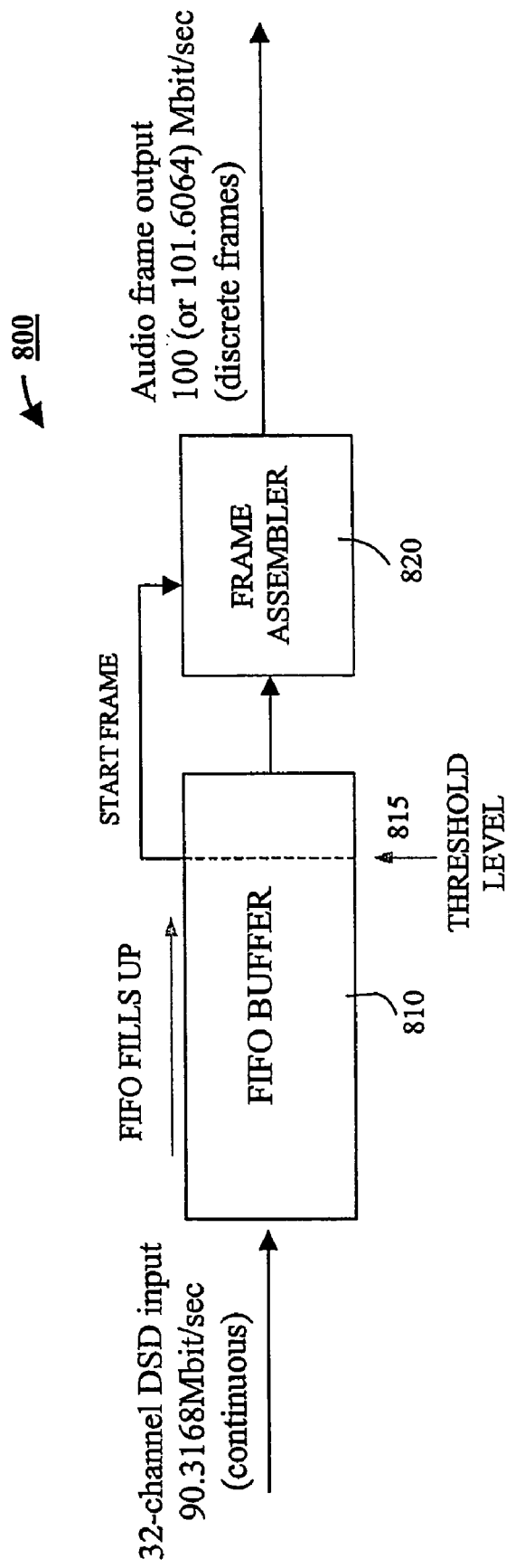
Figure 15:
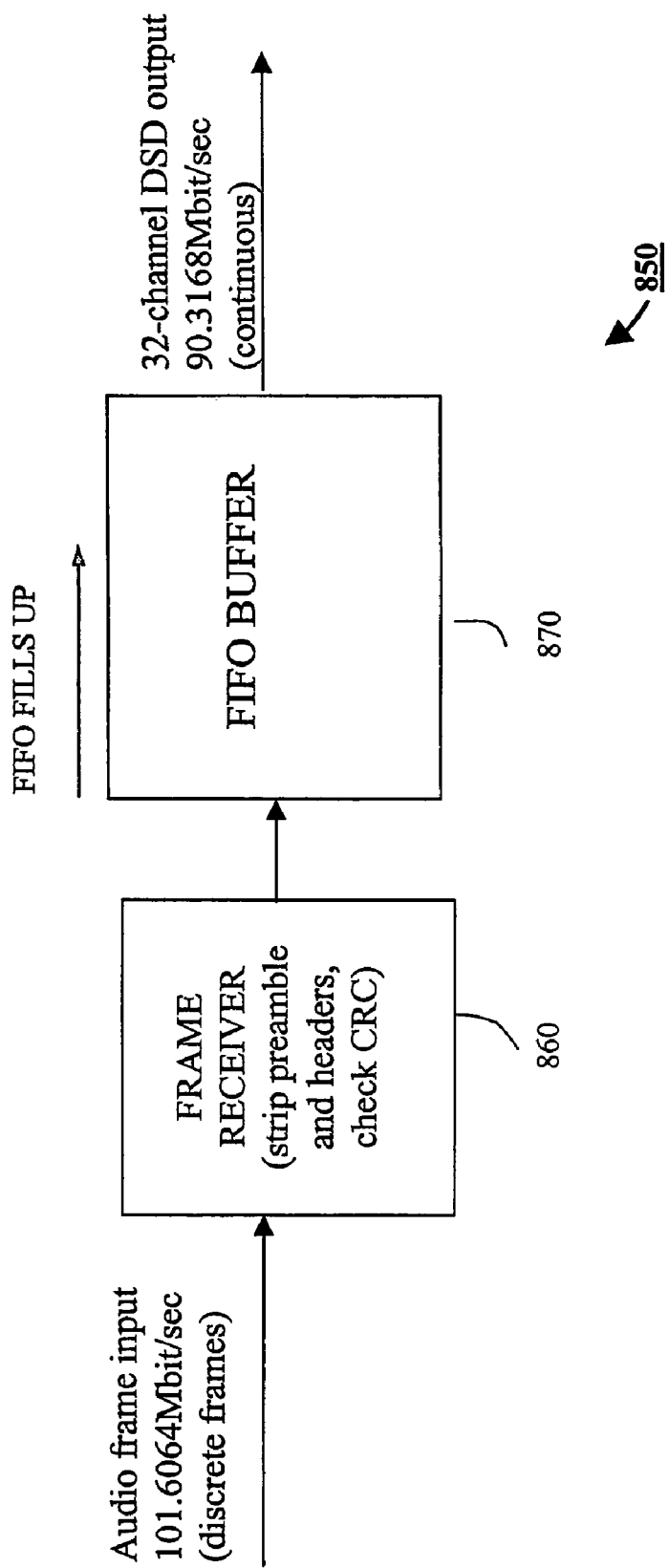
Figure 16:
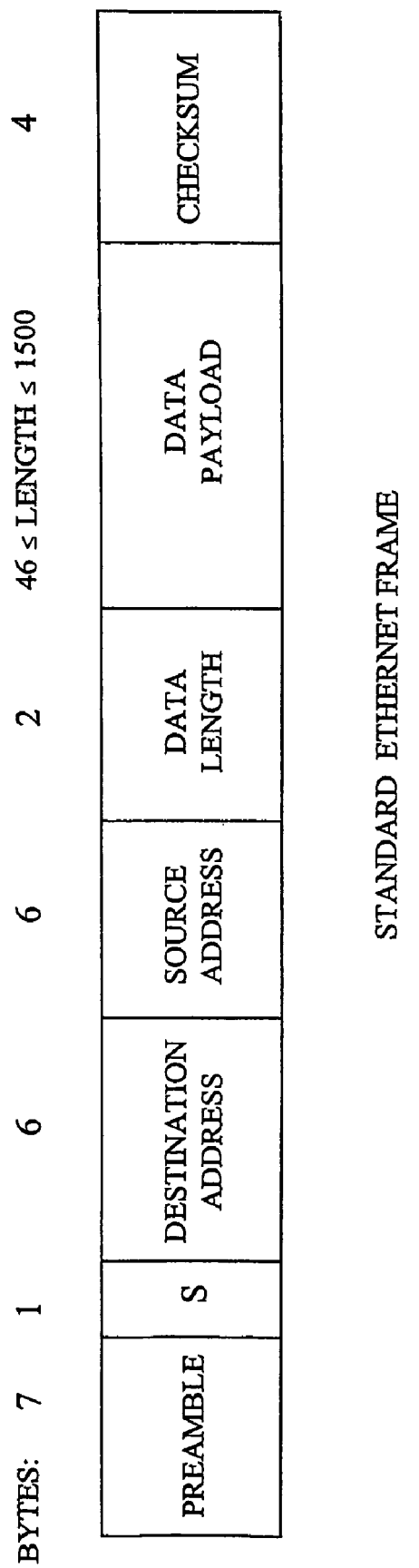
Figure 21:
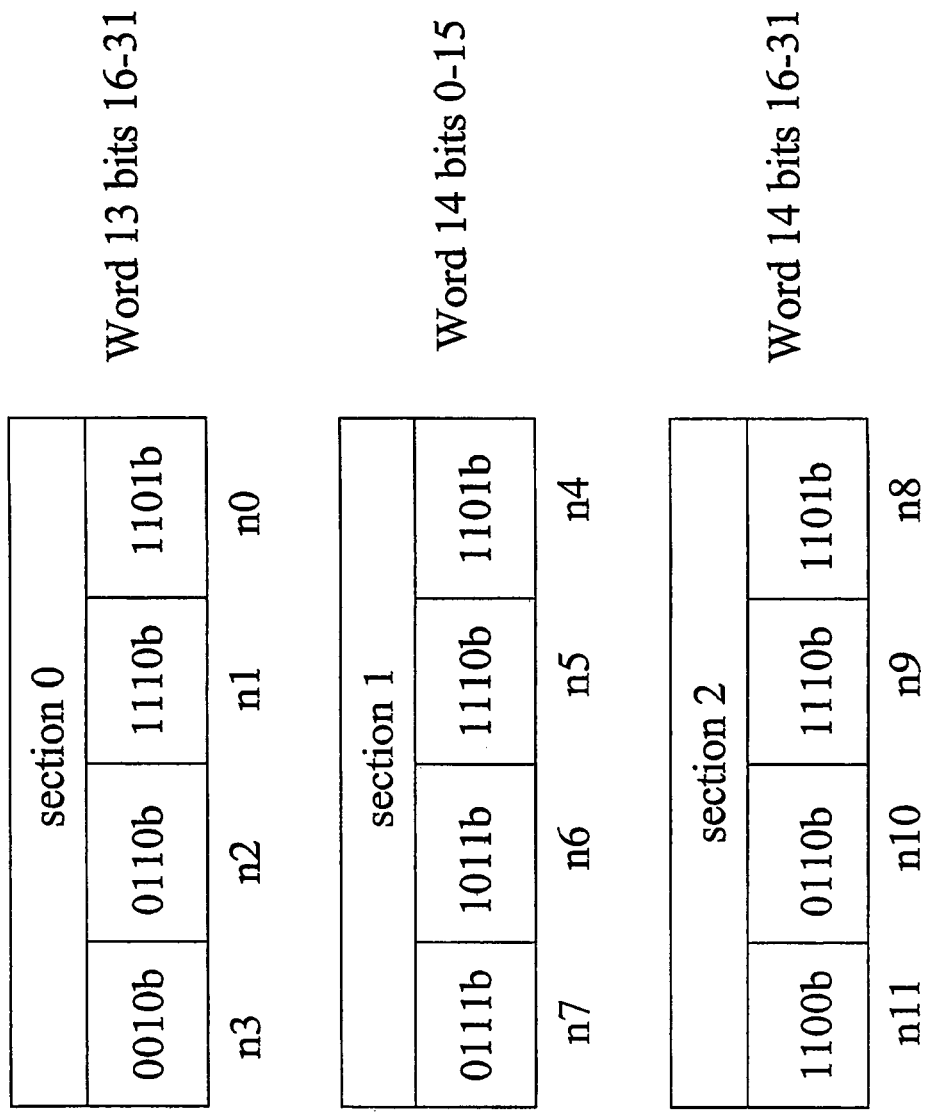

FIG. 3 schematically illustrates a DSD interconnection according to an embodiment of the present invention;

FIG. 4 illustrates a star-configuration interconnection that can be formed between several individual items of DSD equipment;

FIG. 5 schematically illustrates an audio data transmission system according to an embodiment of the present invention;

FIG. 6 schematically illustrates how the $64F_s$ audio sample clock signal is transmitted in parallel with the DSD audio data along different signal pairs of the category 5 cable;

FIG. 7 schematically illustrates reception of the high frequency audio sample clock in parallel with reception of the DSD audio data signal;

FIG. 8 schematically illustrates the signal path of the 64Fs DSD sample clock signal;

FIG. 9 depicts an embodiment of the invention in which the synchronisation of the physical layer device is adjusted such that it is an exact multiple of the audio sample clock frequency;

FIG. 10 schematically illustrates a point-to-point audio device link in which one device acts as a clock master whilst the other device acts as a clock slave;

FIG. 11 is a flow chart which illustrates the sequence of events followed to establish a synchronised link between the master device and the slave device of FIG. 8;

FIG. 12 schematically illustrates an apparatus in which multiple parallel links are used between two pieces of audio equipment in order to achieve a higher channel count than that achievable via a single point-to-point link;

FIG. 13 is a flow chart illustrating how the local clock signals $F_s(A)$ and $F_s(B)$ are employed to ensure that the outputs of two receivers are kept synchronous;

FIG. 14 schematically illustrates how audio data buffering is performed in the transmitter;

FIG. 15 schematically illustrates how audio data buffering is performed at the receiver;

FIG. 16 schematically illustrates the data structure corresponding to a standard Ethernet frame;

FIG. 17 shows the structure of an audio data frame according to an embodiment of the present invention;

FIG. 18A shows the audio data frame format arranged as 384*4-byte data words;

FIG. 18B schematically illustrates a 24 DSD channel frame format in which each frame comprises 368 data words including 352 DSD samples for 24 channels plus 88 bytes of auxiliary data;

FIG. 19 shows the control data format arranged as 26*4-byte data words;

FIG. 20 schematically illustrates the structure of each of the three 16-bit frame format field sections corresponding to the frame format of FIG. 18B;

FIG. 21 schematically illustrates the three 4-nibble sections of the frame format ID containing a set of data entries to be processed at the receiver;

FIG. 22 schematically illustrates the format of the 32-bit data block corresponding to the 24 DSD channel frame format of FIG. 18B;

FIG. 23A schematically illustrates how six parity bits P0 to P5 are generated from 24 audio data bits and the two auxiliary data bits;

FIG. 23B schematically illustrates how the syndrome is calculated from the received data block elements.

Figure 25:
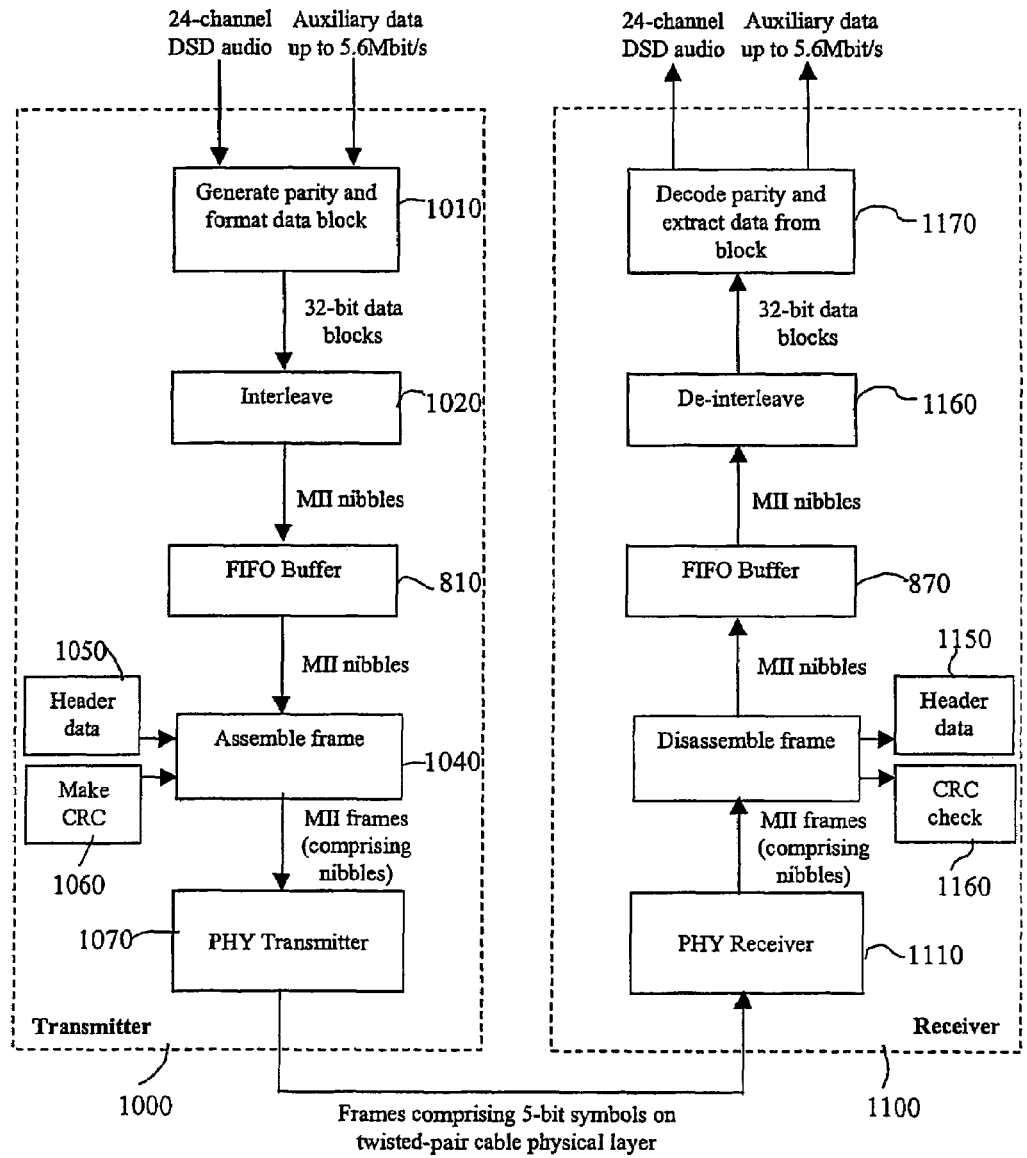

FIG. 24 is a table showing a the composition of a stream of nibbles from the interleaver for the 24 DSD channel frame format of FIG. 18B;

FIG. 25 schematically illustrates the protocol layers of the MAC-DSD protocol for the particular example embodiment using the 24 DSD channel frame format.

As described above, some known audio networking systems use the data link layer of Ethernet for transmission of uncompressed digital audio data at standard sampling frequencies of around 48 kHz. By way of contrast, embodiments of the present invention use the physical layer of Fast Ethernet to provide a point to point connection for transmission of high frequency (2.8224 MHz) digital audio data. The advantages of using the physical layer of Fast Ethernet for audio data transmission are that it offers a large bandwidth, has proven electromagnetic compatibility and has error detection functionality (cyclic redundancy checks) already in place. Use of the physical layer makes the logic easy to design and implement. There is no need to be concerned with hardware addressing and implementation of windowing protocols as would likely be required if the audio data were encoded using higher layer (e.g. MAC layer) technology. Furthermore at the physical layer level, Ethernet data transmission is robust and spectrum controlled so that electromagnetic emissions are low.

In order to explain the principles by which the present embodiments operate, the layered structure of network protocol architectures and the lower layers of the Ethernet architecture will be described in detail below.

Figure 1:
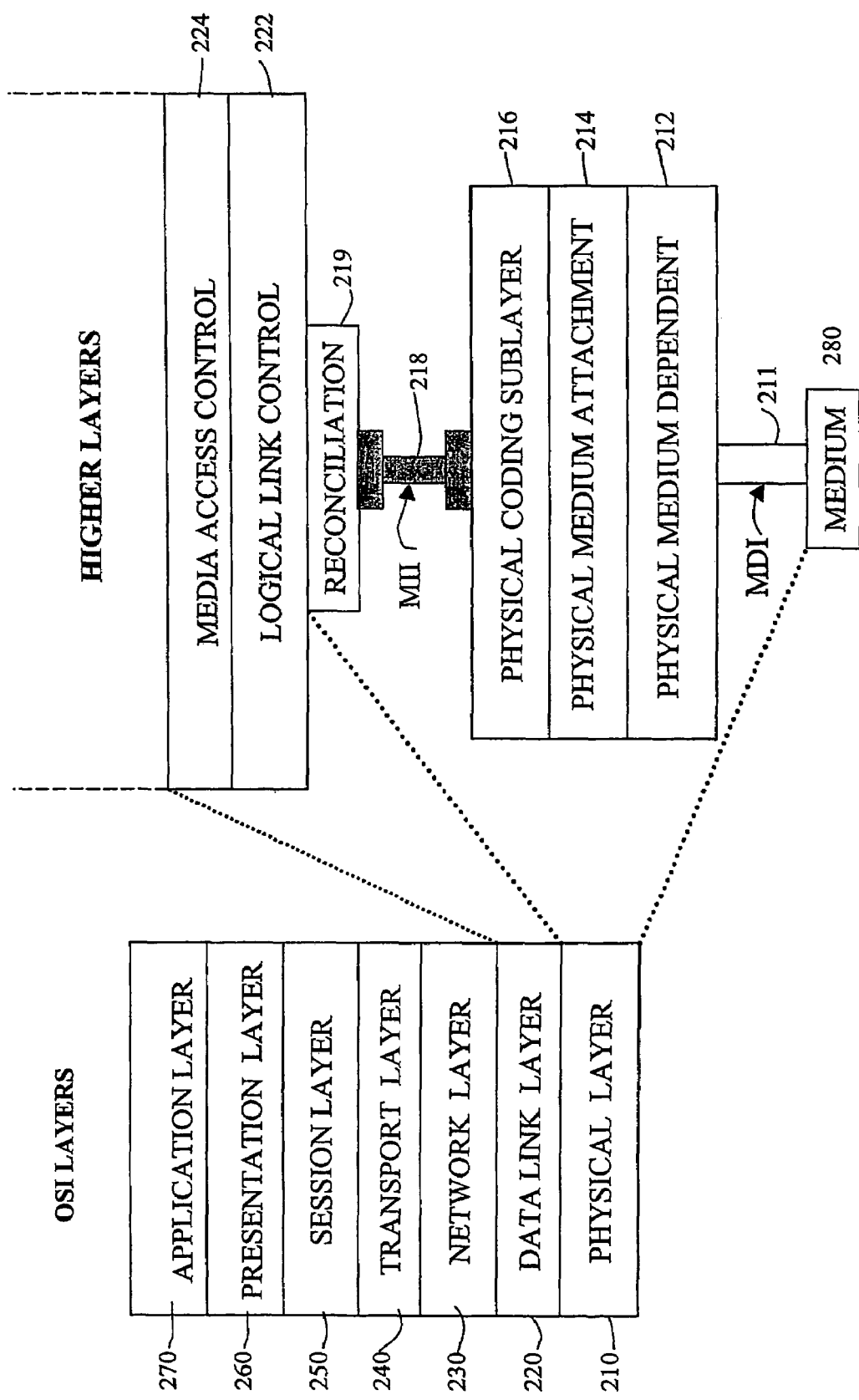
FIG. 1 shows the standard seven-layer Open Systems Interconnection (OSI) model for network protocol architectures and sub-layers of the Ethernet physical layer.

FIG. 1 shows the standard seven-layer Open Systems Interconnection (OSI) model for network protocol architectures. The model comprises an application layer 270, a presentation layer 260, a session layer 250, a transport layer 240, a network layer 230, a data link layer 220, and a physical layer 210.

The application layer 270 provides a user interface, usually in the form of an application program, to a range of distributed information services on the network. The services provided by this layer include file transfer, access and management, as well as general document and message interchange services such as electronic mail.

The presentation layer 260 is concerned with the representation of data during transfer between two communicating application processes. It selects an appropriate transfer syntax to be used during a transaction, so that the structure of the messages being exchanged between two application entities is maintained. The presentation layer 260 also manages data encryption and data compression.

The session layer 250 establishes sessions between communicating applications on communicating network nodes. It may optionally provide interaction management during two-way alternate i.e. half-duplex (rather than two-way simultaneous i.e. full-duplex) data exchange. Further optional features provided by this layer are synchronisation for lengthy network transactions and exception reporting.

The transport layer 240 acts as an interface between the higher application-oriented layers (session 250, presentation 260 and application 270 layers) and the underlying network-dependent protocol layers 210, 220, 230. The transport layer provides the session layer with a defined set of message transfer facilities. It offers a number of classes of services appropriate to different types of network, ranging from class 0 which provides basic connection establishment to class 4 which provides full error control and flow control.

The lowest three layers (network 230, data link 220 and physical layers 210) of the OSI model are all network dependent. The network layer 230 is responsible for establishing and clearing a connection between two transport layer protocol entities and it supports network routing and addressing. The data link layer 220 provides the network layer with a reliable information transfer facility and is responsible for such functions as error detection and message retransmission. Typically both a connectionless and a connection-oriented service is provided. The connectionless service simply discards received frames in which an error is detected whereas a connection-oriented service aims to provide an error-free information transfer facility. Finally, the physical layer 210 provides the data link layer 220 with a means of transmitting a serial bit stream between two pieces of equipment. It converts the data into the stream of electric or analogue pulses that will actually cross the transmission medium and it oversees the transmission of data.

Ethernet is a local area network (LAN) technology, which uses a simple or branching bus-like connection line. The transmission medium in an Ethernet network is formed from one or more continuous lines of cable linked by hubs. Network devices are connected to the cable and they compete for network access using a Carrier Sensing Multiple Access with Collision Detection (CSMA/CD) protocol. According to the CSMA/CD protocol, all client devices monitor the transmission medium and wait until the transmission line is available before transmitting any messages. If two network nodes try to transmit messages at the same time, a collision occurs. The client devices then stop, wait for a random time interval and attempt to transmit again.

Standard Ethernet systems known as 10BASE-T systems provide transmission speeds up to 10 Mega bits per second (Mbps) whereas so-called "Fast Ethernet" (or 100BASE-T) systems provide transmission speeds of up to 100 Mbps. Further higher performance systems are available such as so-called "Gigabit Ethernet". Fast Ethernet uses the same wiring systems, Media Access Control (MAC) method and frame methods as 10BASE-T Ethernet. The embodiments may use any of these systems.

Ethernet systems may use twisted pair cabling or an optical fibre connection. Twisted pair is standard copper wire that is typically used to connect computers to a telephone link. To reduce cross-talk or electromagnetic induction between pairs of wires, two or more insulated wires are twisted around each other. The twisting reduces the effective radiating area of the cable because electromagnetic effects of alternate twists tend to cancel at distances greater than the twist pitch. Each connection on twisted pair requires two wires. If the twisted pair is enclosed by a shield that functions as a ground it is known as shielded twisted pair (STP). Standard twisted pair cabling is known as unshielded twisted pair (UTP).

In Fast Ethernet systems the segment length for twisted pair cable segments is set to a maximum of 100 m to ensure that signal round-trip timing specifications are met. The problem with Fast Ethernet is how to achieve a data transfer rate of 100 Mbit/s over unshielded twisted-pair cable (UTP). In practice there are two standards that can be used to achieve this, one of which (100BASE-4T) uses voice-grade category 3 cable and another (100BASE-X) which uses either high-quality category 5 UTP cable, shielded twisted-pair cable (100BASE-TX) or optical fibre (100BASE-FX). In the 100BASE-X system each type of transmission medium requires a different Physical Medium Dependent (PMD) sub-layer. Category 5 UTP comprises 4 signal pairs, two pairs of which are typically utilised for Ethernet i.e. one signal pair for clock transmit and receive and one signal pair for data transmit and receive. This leaves two unused signal pairs.

The sub-layers of the Ethernet physical layer and data link layer are shown alongside the seven layer OSI model.

The data link layer 220 comprises the Media Access Control (MAC) layer 224 and the Logical Link Control (LLC) layer 222. The physical layer comprises a reconciliation sub-layer 219, a Media Independent Interface (MII) 218, a physical coding sub-layer 216, a physical medium attachment sub-layer 214, a physical medium dependent sub-layer 212 and a Medium Dependent Interface (MDI) 211.

The MAC sub-layer 224 performs the two main functions of data encapsulation and media access management. The data encapsulation functionality includes data framing, handling of source and destination addresses and detection of physical medium transmission errors. The medium access management functionality includes medium allocation (collision avoidance) and contention resolution (collision handling).

The MAC sub-layer 224 can operate either in half-duplex mode or in full duplex mode. In half-duplex mode, network nodes contend for use of the physical medium using multiple access (CSMA/CD) algorithms. The full duplex mode allows for simultaneous transmission and reception without interference. For the full duplex mode to be used three conditions must first be satisfied. Firstly, the physical medium must be capable of supporting simultaneous transmission and reception without interference. Secondly there must be exactly two nodes on the local area network so that the physical medium is treated as a full duplex point-to-point link between the nodes. The use of CSMA/CD algorithms is unnecessary in this full duplex case because there is no contention for use of a shared medium. The third condition is that both network nodes must be configured to use full duplex operation.

The Logical Link Control (LLC) layer 222 performs error-checking functions on data frames and manages links between communicating network nodes.

The Reconciliation 219 sublayer maps the signal set provided at the Media Independent Interface 218 to the Physical Coding Sublayer 216.

The Physical Coding Sub-layer (PCS) 216 provides a uniform interface to the Reconciliation sub-layer for all 100BASE-TX physical layer entity (PHY) implementations. The PCS 216 provides all services required by the MII including: encoding of MII 4-bit "data nibbles" to 5-bit code groups (and also decoding from 5-bit to data nibbles); generation of carrier sense and collision detect indications; serialisation of code-groups for transmission on the underlying PMA sub-layer 214 (and de-serialisation of code groups on reception from the PMA 214); and mapping of transmit, receive, carrier sense and collision detection between the MII 218 and the underlying PMA 214.

The Physical Medium Attachment (PMA) sub-layer 214 provides a medium-independent means for the PCS to support the use of a range of physical media. The 100BASE-TX PMA performs the functions of: mapping of transmit and receive code-bits between the underlying Physical Medium Dependent (PMD) sub-layer 212 and the PCS 216; and generating a control signal indicating the availability of the PMD 212 to a PCS 216. The PMA sub-layer 214 may optionally: generate indications of carrier errors from the underlying PMD sub-layer 212; sense receive channel failures; and transmit far-end fault indications.

The PMD sub-layer 212 is effectively a set of signalling standards that define 125 Mbit/s full duplex signalling systems, which accommodate multi-mode optical fibre (F), shielded twisted pair (STP) and unshielded twisted pair (UTP) wiring.

The purpose of the Media Independent Interface (MII) 218 is to provide a simple interconnection between the MAC sub-layers 222, 224 and the physical layer entities (PHYs) for data transfer at 10 Mbit/s and 100 Mbit/s. The functionality is identical at both data rates, as are the signal timing relationships. The only difference between 10 Mbit/s and 100 Mbit/s operation is the nominal clock frequency. The MII 218 is used to provide media independence for various forms of unshielded twisted-pair wiring, shielded twisted-pair wiring, fibre optic cabling and potentially other media, so that identical MACs may be used with any of these media. The MII 218 maximises media independence by cleanly separating the Data Link Layer 220 and the Physical Layer 210 of the OSI seven-layer reference model. The data and delimiters of the MII 218 are synchronous to clock references and the MII uses Low Voltage Transistor-Transistor Logic (LVTTL) signal levels compatible with common integrated circuit processes. The MII 218 provides independent 4-bit wide data-transmit and data-receive paths and full duplex operation. Each direction of data transfer is serviced with 7 signals: a 4-bit data bundle, a 1-bit delimiter signal, a 1-bit error signal and a 1-bit clock signal.

Figure 2:
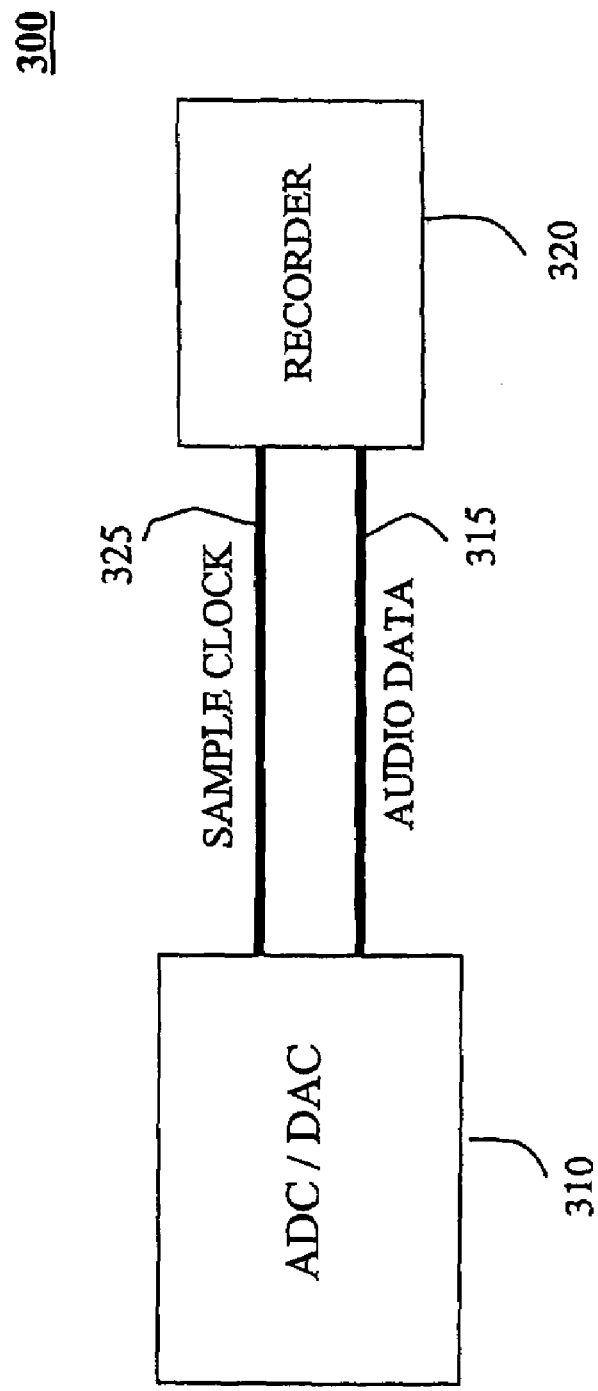
FIG. 2 illustrates a known system for signal transfer in DSD systems.

FIG. 2 illustrates a known system for signal transfer in Direct Stream Digital systems. The apparatus 300 comprises an analogue-to-digital/digital-to-analogue (ADC/DAC) converter 310 connected to a DSD multi-channel recorder 320. The connection comprises two separate cables: a first cable 315 is an optical fibre carrying 8 channels (about 22.6 Mbit/s) of DSD audio data and a second cable 325 carries the high frequency sample clock. It is standard studio practice to use separate cables for the audio data and the sample clock.

FIG. 3 schematically illustrates a DSD interconnection according to an embodiment of the present invention. In this arrangement 400, a single cable 405 is used to connect a multi-channel ACD/DAC 410 to a DSD multi-channel recorder 420. The cable 405 is a category 5 unshielded twisted pair cable. This cable has four signal pairs, two pairs of which are used to transmit and receive audio data, encoded using Ethernet physical layer technology and the remaining two pairs of which are used to convey a DSD sample clock in both directions across the link (see Table 1 below). The clock signal and the audio data signal are conditioned to decrease the likelihood of interference between the two signals degrading the quality of the clock signal. The clock signal is used to synchronise a phase locked loop (PLL) in the receiving device, which in turn may be used as a sample clock for ADCs and DACs. Any jitter on the sample clock is undesirable since it will manifest itself as distortion on the reproduced analogue audio output. The audio signal is intrinsically digital and consequently more robust to degradation than the clock signal. A packet data transmission system such as Ethernet is capable of carrying the DSD audio data. In this particular embodiment, the physical layer of Fast Ethernet (100BASE-TX is used to provide a channel bit-rate of 100 Mbit/s which accommodates audio data from 32 DSD channels on a single link. In an alternative embodiment the 100 Mbit/s link is used to support 24 DSD channels on a single link.

Ethernet is an asynchronous data link and is thus inherently unsuitable for transmission of the high-integrity, 64F$_s$ audio clock signal. For this reason the audio sample clock is transmitted on separate signal pairs of the category 5 UTP cable.

The single cable connection in FIG. 3 is fundamentally a point to point link directly connecting the two audio devices. It uses a special "crossover" category 5 cable that is wired to reverse the input/output connections. In this case a custom made crossover cable is required because conventional crossover cables such as those used for office networking do not reverse the two spare signal pair connections used in this embodiment for transmission of the audio sample clock.

In alternative embodiments of the invention, such as that illustrated in FIG. 4, more complex interconnections can be formed between several individual items of DSD equipment. The apparatus illustrated in FIG. 4 comprises a star-configuration DSD router 430, a multi-channel ADC/DAC 440, a DSD mixer 450 and a DSD multi-channel recorder 460. Three point-to-point links 445, 455 and 465 are connected together via the central DSD router 430. Unlike the connection of FIG. 3, standard category 5 cable can be used for each of the three connections in this star configuration. This is because the port connections on the router are internally reversed such that signal outputs of one device connect to signal inputs of another device.

The router 430 comprises a number of signal transceivers, each transceiver comprising a data clock transmitter (described below with reference to FIG. 6) and a data and clock receiver (described below with reference to FIG. 7). Switching and routing functions are carried out by a crosspoint switch (not shown) acting on the recovered clock and streamed audio data. In other words, signals are not transferred across the router in packetised form.

The cable 405 linking the transmitter device to the receiver device in FIG. 3 is terminated with 8-terminal RJ45 plugs and both transmitter and receiver devices are fitted with RJ45 sockets. The table below specifies the setting of the RJ45 socket terminal connections for the audio devices of FIG. 3 and for the star-configuration router devices of FIG. 4.

TABLE 1

| Pin number | Function (audio device) | Function (star-configuration router) |
| --- | --- | --- |
| 1 | Data transmit + | Data receive + |
| 2 | Data transmit − | Data receive − |
| 3 | Data receive − | Data transmit − |
| 4 | Clock transmit + | Clock receive + |
| 5 | Clock transmit − | Clock receive − |
| 6 | Data receive + | Data transmit + |
| 7 | Clock receive − | Clock transmit − |
| 8 | Clock receive + | Clock transmit + |

FIG. 5 schematically illustrates an audio data transmission system according to an embodiment of the present invention. The apparatus 500 comprises a first audio processing device 510 and a second audio processing device 520 linked by a category 5 unshielded twisted pair cable 515. Each audio processing device comprises a Field Programmable Gate Array (FPGA) 512, a physical layer interface (PHY) 514, a transformer 516 and an RJ45 8-pin connector 518. The FPGA 512 provides a Multichannel Audio Connection for DSD (MAC-DSD).

1-bit 64Fs direct stream digital data is supplied from the audio device to the FPGA 512. During a transmission operation the FPGA 512 performs audio data buffering and framing operations whereas during data reception the FPGA extracts data from the framed structure and converts it back to a DSD stream. The FPGA performs transmission and reception concurrently, implementing a full-duplex audio connection. The format of the data frames will be described in detail below with reference to FIGS. 15 and 16. The PHY device 514 performs physical layer coding of the framed audio data, implements spectrum control processing and has line drivers that amplify the current and hence the power of the signal to increase its robustness during transmission. The PHY device 514 effectively implements the Physical Coding Sublayer (PCS), Physical Medium Attachment (PMA) and Physical Medium Dependent (PMD) sub-layers of the physical layer 210. In this embodiment the PHY device 514 is an Intel™ LXT972a component and it operates in full duplex mode with no auto-negotiation and with data scrambling on. The transformer 516 outputs the data for transmission on the category 5 cable 515. On reception the transformer 516 receives the signal prior to physical layer processing. The interface between the FPGA 512 and the PHY device 514 is a Media Independent Interface (MII). Thus the FPGA replaces the network address handling Media Access Controller (MAC) of the conventional Ethernet system. Multiple sample rates are supported and the system is able to accommodate potential developments towards higher DSD sample rates. Any change to the audio sample rate affects the way audio data streams are packed into data frames and this functionality is determined by circuitry in the FGPA 512. Provided that the physical layer link has sufficient bandwidth changes in the audio sample rate have no effect on the PHY device 514.

FIG. 6 schematically illustrates how the $64F_s$ audio sample clock signal is transmitted in parallel with the DSD audio data along different signal pairs of the category 5 cable. As in FIG. 5, the FPGA 512, the PHY device 514 and the transformer 516 perform the audio data signal processing prior to its transmission on two signal pairs of the Category 5 UTP cable 515. The $64F_s$ audio sample clock is supplied as input both to the FPGA, which performs framing and buffering, and to a low pass filter 552. The low-pass filter serves to reduce electro-magnetic emissions during transmission of the clock signal. The output of the low-pass filter 552 is supplied as input to a differential line driver 554 and is subsequently fed through a 10BASE-T type Ethernet transformer 556. The clock signal is fed via the RJ45 connector 518 onto a signal pair on the category 5 UTP cable 515 where it is transmitted in parallel with the audio data. Transmission of the audio sample clock signal is important since it enables the FPGA of the receiving device to resynchronise the received audio data and thus to reconstitute the DSD bitstreams. The category 5 UTP cable used in this embodiment of the invention has a characteristic impedance of 100 Ohms. Alternative embodiments may use screened twisted pair cable, which gives enhanced electromagnetic compatibility (EMC) performance. Further alternative cable types that may be used include category 5e cable (for data rates of up to 250 Mbit/s), category 6 cable (suitable for Gigabit Ethernet or category 7 cable which allows even higher data transmission rates.

The FPGA is only one solution to achieve the functionality required at the transmitter and receiver. Software-controlled general purpose microprocessors may of course be used, in which case the software could be provided by a storage medium (e.g. a read-only memory, flash memory, magnetic disk or optical disk) or a transmission medium (e.g. a network or the internet)

FIG. 7 schematically illustrates reception of the high frequency audio sample clock in parallel with reception of the DSD audio data signal. The parallel signals are received from the cable 515 at the RJ45 connector 522 of the receiving device. The DSD audio signal is received by a transformer 524 and is then supplied to a physical layer interface 526 followed by an FPGA 528 which unframes the data and produces a DSD bit stream. The DSD audio stream is output from the FGPA according to a 64Fs clock signal 529 derived from the local phase locked loop of the receiving device.

The received audio clock signal is supplied to a transformer 562 on arrival at the receiving device. The output of the transformer is supplied to a high pass filter 563 and then to a low pass filter 564, which is of the same type as the low pass filter 552 in the transmitting device. The low pass filter 564 in the receiver serves to remove any high frequency interference in the received signal, derived either from the audio data signal, which it travelled adjacent to along the cable 515, or from external sources. The output from the low-pass filter is supplied to a comparator 568 where it is converted to a logic signal. The logic signal from the comparator is used to drive a local phase locked loop (PLL) circuit. A phase locked loop (PLL) is an electronic circuit that controls an oscillator so that it maintains a constant phase angle relative to a reference signal. In this case the received high frequency clock signal is the reference signal. The PLL circuit generates a local audio reference clock which is used for reproduction of the DSD audio data.

FIG. 8 schematically illustrates the signal path of the 64Fs DSD sample clock signal. As explained above, the DSD sample clock is transmitted in both directions via dedicated differential signal pairs in the category 5 UTP interconnection cable 515. The sequence of processing operations performed on the high frequency ($64F_s$) clock signal will now be described with reference to FIG. 8. Special analogue conditioning of the sample clock signal is performed to facilitate its transmission on a signal pair of the UTP cable adjacent to the asynchronous data signal. The analogue conditioning reduces the severity of electromagnetic interference effects from the asynchronous data signal (or from external sources) which compromise the integrity of the high frequency sample clock signal. As schematically illustrated in FIG. 8, the sample clock processing that occurs in the clock master system involves the low pass filter 552, the differential line driver 554 and the transformer 556. The sample clock processing chain in the clock slave system involves the transformer 562, a high pass filter 563 and the comparator 568.

The input to the low pass filter 552 of the clock master is a 2.8224 MHz (64Fs) logic signal 551. The frequency tolerance of this signal is in accordance with the Grade 2 specification defined by the standards document AES11-1997. Accordingly the sample clock has a long-term frequency stability of +/−10 parts per million (ppm), with an external synchronisation range of +/−50 ppm. The duty cycle of the sample clock in the range 40-60% and a Low Voltage Transistor-Transistor Logic (LVTTL) logic signal is used.

The 64 Fs logic clock signal 569 output by the comparator 568 of the clock slave system is also a logic signal of frequency 2.8224 MHz (64Fs). This clock output signal 569 is not used to synchronise any digital audio components directly because the link 515 characteristics may well have introduced substantial jitter and asymmetry to the clock signal. Rather, the clock output signal is used exclusively to synchronise an edge-triggered phase locked loop (PLL) in the receiver system. The clock output signal 569 is carefully routed within the receiver to ensure that any noise and jitter on the signal does not couple into other high-quality clock signals. The PLL circuit (not shown) of the clock slave system is used to generate high quality audio clock signals for distribution throughout the receiving system.

The low pass filters 552, 564 in both the transmitting (clock master) system and receiving (clock slave) system are second-order low-pass Butterworth filters, each having a cut-off frequency fc=2.9 MHz.

The transmitter low-pass filter 552 attenuates high-frequency components of the clock signal that may otherwise cause interference with the adjacent audio data signals in the cable or cause excessive RF emissions from the cable. The receiver low-pass filter 564 on the other hand, removes high-frequency interference from the clock signal induced by either the adjacent high-frequency data signals or by external sources.

The differential line driver 554 located in the transmitter generates a symmetrical output signal of differential peak-peak voltage 1.5V-2.5V into 100 Ohms (the impedance of the category 5 UTP link).

The transformers 556, 562 in both transmitter and receiver are 10Base-T Ethernet transformers having a 1:1 turns ratio and line-side common mode chokes.

The high-pass filter 563 in the receiver is a first-order high pass filter having a cut-off frequency fc=500 Hz. This filter removes low-frequency interference from mains supply sources, and blocks DC offset. This filter is implemented with a simple resistance-capacitance (R-C) combination.

The comparator 568 in the receiver converts the filtered analogue clock signal from the low pass filter 564 into a logic signal. In order to avoid or reduce noise-induced multiple edges a 2% hysteresis is used.

FIG. 9 shows an embodiment of the invention in which the synchronisation of the physical layer device is adjusted so it is an exact multiple ($9*64F_s$) of the audio sample clock frequency $64F_s$. The Ethernet standard specifies a 25 MHz symbol rate for data transmission. It is conceivable that transmission of the 2.8224 MHz sample clock along the same category 5 UTP as a asynchronous 25 Mhz audio data signal could result in undesirable degradation of the audio clock. Synchronising the audio data transmission with the sample clock may help to reduce the degradation of the high-quality audio clock signal. The apparatus shown in FIG. 9 comprises a multiplier 572 which takes a $64F_s$ clock signal as input and up-converts it in frequency by a factor of 9 using a phase locked loop. The output from the ×9 multiplier 572 is input to the PHY device of the transmitter so that a $576F_s$ (25.4016 MHz) audio data signal is generated. Accordingly, this embodiment uses a 25.4016 MHz symbol rate for audio data transmission rather than the standard 25 MHz Ethernet symbol rate. As a consequence of the increased symbol rate the channel bit rate increases from 100 Mbit/s to 101.6064 Mbit/s.

Therefore, this embodiment of the invention can potentially reduce degradation of the audio clock signal but this is at the expense of removing compatibility with the 25 MHz symbol rate of standard Ethernet systems.

FIG. 10 schematically illustrates a point-to-point audio link in which one device acts as a clock master 600M whilst the other device acts as a clock slave 600S. Each of the audio processing devices comprises a clock source PLL 602M/602S, a clock receiver (Rx) 604M/604S, a lock detect module 606M/606S, a clock transmitter (Tx) 608M/608S, an audio input/output (I/O) system 610M/610S and a switch 612M/612S. The suffix M denotes a component associated with the master device 600M whereas the suffix S indicates a component associated with the slave device 600S. DSD audio data passes along a UTP cable (not shown) which links the audio I/O system 610M of the master with that of the slave 610S.

The category 5 UTP cable provides independent connections such that under normal operating conditions clock signals are transferred in both directions between two audio devices. However in an active link one of the devices must be designated clock master 600M and the other device is thus designated the clock slave 600S. The clock master transmitter 608M sends an audio clock signal 605M to the clock receiver 604S of the clock slave. The master clock signal 605M is used by the phase locked loop 602S of the slave to produce a synchronisation signal that is supplied to the slave audio I/O system 610S. The audio clock signal 605S that is sent from the slave transmitter 608S to the clock receiver of the master 604M is not supplied to the phase locked loop 602M of the master because the switch 612M of the master is left in an open state. However the slave clock signal 605S is compared with the local master clock by the lock detect module 606M of the master device to detect synchronisation of the remote slave system.

FIG. 11 is a flow chart, which illustrates the sequence of events followed to establish a synchronised link between the master device and the slave device of FIG. 10.

At stage 620 the transceiver of device B 600S is set to slave mode and the clock transmitter 608S is temporarily disabled (until the link is established and a lock state has been achieved). This acts as a safeguard against two slave devices attempting to synchronise each other with unpredictable consequences.

At stage 630 the UTP cable is used to physically connect the master device 600M to the slave device 600S thereby establishing the link. On connection of the cable both the master device 600M and the slave device 600S detect that the link is currently valid. The master device begins transmitting the clock signal 605M but the slave device's clock transmitter 608 is temporarily disabled.

At stage 640 the slave device's clock receiver 604S detects the incoming master clock signal 605M and feeds this to the local slave phase locked loop circuit 602S which locks to the incoming master clock signal.

At stage 650 the slave device 600S detects the lock condition by comparing its local system clock with the incoming master clock signal 605M via the lock detect module 606S. Closing the switch 612S completes the circuit between the slave PLL 602S the slave clock receiver 604S and the slave lock detect module 606S and thus enables lock detection. Once the slave lock detect module 606S signals that lock with the master clock has been established, the slave clock transmitter 608S is switched from the disabled state to an enabled state and the slave device 600S audio buffers (located in the audio I/O system 610S) are reset.

At stage 660 the master device clock receiver 604M receives the echoed clock signal from the recently enabled slave clock transmitter 608S and checks the phase of this echoed signal to verify that the slave device has synchronised correctly with the master clock signal 605M. If synchronisation has not been correctly established then audio transmission is not enabled.

At stage 670, having established that the slave device is correctly synchronised the master device resets its audio buffers (located in the audio I/O system 610M) and enables audio data transmission, whereupon framed DSD audio data is sent along the UTP cable linking master and slave devices.

The flow chart of FIG. 11 describes the standard process of establishing synchronisation between the master device and the slave device. However, it may be the case that an attempt is made to establish a link between two audio devices, both of which have been set to slave mode. In this event, the clock transmitters of both devices are disabled at the point where the devices detect a valid data link and an indication is made to the operator that the link is not synchronised. The link conditions are indicated to the user via LED status indicators (not shown) located adjacent to the RJ45 cable connection ports. Table 2 below gives an LED status for each of a number of possible link conditions. In particular a red or yellow LED "on" status corresponds to a clock synchronisation failure of the type that would be encountered during an attempt to link two slave mode audio devices.

TABLE 2

| LED status | Condition |
| --- | --- |
| No LED on | No Ethernet PHY connection detected |
| Red (or yellow) LED on | Ethernet PHY connection detected, but clock synchronisation failed/not present/not locked. Audio transfer inhibited |
| Green LED on | Ethernet PHY connection detected, slave device has locked to master device clock, and link is active |
| Both LEDs on | (illegal indication) |

FIG. 12 schematically illustrates an apparatus in which multiple parallel links are used between two pieces of audio equipment. Use of multiple links means a higher channel count is achieved than that achievable via a single point-to-point link. In this case two links are used to provide a total of 64 channels. A transmitter device 700A comprises a first transmitter 702, a second transmitter 704 and a clock generator 706. A receiver device 700B comprises a first receiver 712, a second receiver 714 and a clock generator 716. A first category 5 UTP cable 721 carries audio data channels 1 to 32 (or 1 to 24) and links the first transmitter 702 to the first receiver 712. A second category 5 UTP cable 723 carries audio data channels 33 to 64 (or 25 to 48) and links the second transmitter 704 to the second receiver 714.

When operating the apparatus of FIG. 12, it is necessary to ensure that the DSD audio data streams output by the first receiver 712 are sample-synchronised with the DSD audio data streams output by the second receiver 714 i.e. the samples from channels 1 to 32 (or 1 to 24) are synchronised with the samples from channels 33 to 64 (or 25 to 48). The transmit and receive latencies of the PHY devices in the transmitters 702, 704 and in the receivers 712, 714 mean that it is possible that the output of receivers 712, 714 could slip out of synchronisation by more than one DSD audio sample period ($3.543 \times 10^{-7}$ seconds). Manufacturer specifications for commonly used PHY devices indicate that combined transmit and receive latencies of the PHY devices could vary by up to $6 \times 10^{-8}$ seconds so that slippage of one DSD sample between receivers is conceivable. Any differences in the lengths of cables 721 and 723 will also affect synchronisation.

As shown in FIG. 12, the first and second transmitters 702, 704 of the transmitting audio system 700A use a common synchronisation reference clock signal $F_s(A)$ running at $F_s=44.1$ kHz. Similarly the first and second receivers 712, 714 of the receiving audio system 700B use a common synchronisation reference clock $F_s(B)$ running at $F_s=44.1$ kHz. These two 44.1 kHz synchronisation clock signals $F_s(A)$ and $F_s(B)$ have identical frequencies both having been derived from a 64Fs master clock signal, but their phases, being arbitrary, are unlikely to match. The arbitrary phases are due to $F_s(A)$ and $F_s(B)$ having been derived from the common 64Fs clock via independent clock dividers. The flow chart of FIG. 13 illustrates how the signals $F_s(A)$ and $F_s(B)$ are employed to ensure that the outputs of receivers 712 and 714 (which have derived their audio data from separate link cables 721 and 723 respectively) are kept synchronous.

At stage 730 of the flow chart of FIG. 13, a communication link between the transmitting system 700A and the receiving system 700B is established. Each of the two transmitters 702, 704 awaits receipt of a clock edge from the local 44.1 kHz clock signal $F_s(A)$ and then transmits the first audio frame. The data frame is packed such that the first DSD sample is input synchronously with the clock edge. The flow chart of FIG. 13 relates to an embodiment in which there are 32 channels of DSD audio. As shall be described in detail below with reference to FIG. 18A, for the 32-channel system each frame comprises 384 data words and words 13 to 382 each contain a 1-bit DSD sample value for each of 32 channels (370 sample values per channel are contained in each frame). The first transmitter transmits the first audio frame corresponding to channels 1 to 32 whilst the second transmitter transmits the first audio frame corresponding to channels 33 to 64. Since in this embodiment each frame contains 370 samples and there are 64 samples per Fs period, a coincident frame start ($1^{st}$ DSD sample value output) and Fs-period start (Fs(A) clock edge) will occur every 370×64 samples. However, 370 and 64 have a common factor of 2 so a frame-start and $F_s$ period-start occur together every (370*64)/2 samples i.e. every 32 frames. Accordingly, the $1^{st}$ DSD sample value of the frame will be output synchronously with the local $F_s(A)$ clock edge for frames 1, 33, 65, 97 . . . and so on. These particular frames have a specific bit flag in a "frame type" field (see FIG. 16) of the data frame set to one.

At stage 732 of the flow chart both the first receiver 712 and the second receiver 714 capture a phase count value $\Phi_j$ (j=1 or 2 corresponding to first and second receivers respectively) marking the point in time at which the first DSD sample value in the first received frame is ready for output. Note that at system start-up the receiver audio outputs are muted and transmitter audio outputs are only enabled once synchronisation of the 64Fs sample clocks has been verified by the master device. The time at which the receiver is ready to output the first DSD sample value will depend on the time taken for the slave device to achieve phase lock with the 64$F_s$ clock signal of the master device. It will also depend on the setting of the threshold level of a FIFO buffer of the particular transmitter. Each receiver derives the phase count value $\Phi_j$ from a counter in the receiver which is clocked by the 64 $F_s$ local clock signal and reset by the 44.1 kHz signal $F_s(B)$.

At stage 734, a system controller (not shown) compares the phase count values, $\Phi_1$ and $\Phi_2$, for each of the receivers and determines if they are identical. If $\Phi_1=\Phi_2$ then the receivers are synchronised to within the same DSD sample period which is the desired condition. In this event the process proceeds to stage 738 where the audio outputs are unmuted. If however, $\Phi_1 \neq \Phi_2$ at stage 734 then the process proceeds to stage 736 where the system controller adjusts the buffer read positions of the receivers in an attempt to achieve synchronisation. The receiver that synchronised with the 64Fs master clock earliest (and hence received DSD audio data first) has its buffer read position adjusted to match the buffer read position of the latest synchronised receiver (which started to receive DSD data later). This buffer read position adjustment is equivalent to modification of the phase count values $\Phi_j$ such that they are both equal to the higher of the two compared phase counts. Only when synchronisation has been achieved i.e. when the phase count values of the receivers are identical will the audio outputs be enabled.

The phase count values of the receivers are cross-checked for every flagged frame (first frame and every following $32^{nd}$ frame) to ensure that synchronisation of the receivers is maintained. Frames are transmitted every 131.25 µs so that flagged frames occur approximately every 4.2 ms (32×131.25 µs). Any receiver synchronisation problem should be detectable and correctable within this 4.2 ms period. Stages 742, 744, 746, of FIG. 13 show the check that is performed by the system controller for every flagged frame. At stage 742 the controller checks the modified phase count value for the current flagged frame and compares it with the final (possibly modified) recorded phase count value for the previous flagged data frame i.e. frame X-32. If the phase count values match then the system continues with audio data transmission at stage 746. However, if the phase count values for the two flagged frames do not match, this indicates that the two receivers are not outputting the same audio sample value simultaneously and the process proceeds to stage 744 where the system controller initiates resetting of the data links in an attempt to restore proper synchronisation. When the data links are reset the receiver logic is put in a reset condition so that the process of stages 732 to 738 of FIG. 11 is carried out. In alternative embodiments the data links are reset by adjustment of the buffer read positions, but in this case a buffer overrun/underrun would trigger a total reset of the link. Sample synchronisation slippage could occur, for example, due to a cable glitch.

For the alternative 24 DSD channel embodiment, as shall be described in detail below with reference to FIG. 18B, each frame comprises 368 data words and words 15 to 366 contain 352 DSD samples for 24 channels plus 88 bytes of auxiliary data. Each 32-bit sample comprises 1-bit from each of the 24 DSD channels, 2 bits of auxiliary data and 6 check-bits. Bit 0 of each sample corresponds to the first logical audio channel whereas bit 23 corresponds to the $24^{th}$ logical audio channel. In this case the first transmitter transmits the first audio frame corresponding to channels 1 to 24 whilst the second transmitter transmits the first audio frame corresponding to channels 25 to 48. Since in this embodiment each frame contains 352 samples and there are 64 samples per Fs period, a coincident frame start ($1^{st}$ DSD sample value output) and Fs-period start (Fs(A) clock edge) will occur every 352×64 samples. However, 352 and 64 have a common factor of 32 so a frame-start and $F_s$ period-start occur together every (352*64)/32 samples i.e. every alternate frame. Accordingly, in the 24 DSD channel embodiment the $1^{st}$ DSD sample value of the frame will be output synchronously with the local $F_s(A)$ clock edge for frames 1, 3, 5, 7, 9 . . . and so on. It follows that every alternate frame will be a flagged frame and the phase count values of the receivers will be cross-checked every alternate frame.

FIG. 14 schematically illustrates how audio data buffering is performed in the transmitter. The buffering apparatus 800 comprises a First In First Out (FIFO) buffer 810 in series connection with a frame assembler 820. In operation, 32 channels of Direct Stream Digital 1-bit sample data are continuously fed into the FIFO buffer at a rate of 64Fs which corresponds to 90.3168 Mbit/s. When the occupation level of the FIFO buffer reaches a predetermined threshold level 815 a signal is generated by the system controller to initiate transmission of a new audio data frame. In response to this signal, the frame assembler assembles the frame preamble and headers, during which time incoming DSD samples continue to be buffered. As soon as the audio data payload assembly begins, the frame assembler starts to extract data from the FIFO. The rate at which data is extracted from the FIFO corresponds to the Ethernet transmission rate of 100 Mbit/s (or 101.6064 Mbit/s for embodiments in which the symbol rate is locked to $9*64F_s$). Since the FIFO is filling at a rate of 90.3168 Mbit/s and emptying at a rate of 100 Mbit/s the net buffer occupation level will steadily decrease during this period. The predetermined threshold level 815 is set in dependence upon the data input rate, the data output rate and the frame size (370 1-bit samples for 32 channels) so that the buffer occupation level will be almost, but not quite, zero at the end of each frame transmission i.e. data from the next frame for transmission is present in the buffer. The fact that the transmitter buffer 810 is not completely empty by the time the frame transmission ends breaks the rules of the MAC. Once the frame transmission is complete the FIFO occupation level will increase rapidly until the threshold level is reached whereupon the frame transmission cycle will repeat.

For a transmission system with an input data rate of 90.3168 Mbit/s, an output rate of 101.6064 Mbit/s and a (370 1-bit sample) (32 channel) frame capacity it can be shown that the minimum buffer size is 42 DSD samples and the corresponding minimum threshold level is 30 DSD samples. The audio latency introduced by this minimum size buffer is 14.9 μs (=42/64Fs).

FIG. 15 schematically illustrates how audio data buffering is performed at the receiver. The receiver buffering apparatus comprises a frame receiver 860 in series connection with a FIFO buffer 870. Audio data arrives (via the category 5 UTP cable) in framed format at the frame receiver 860 at a rate of 100 Mbit/s (or 101.6064 Mbit/s for the $9*64F_s$ symbol rate). The frame receiver strips off the preamble and headers of each data frame and optionally performs a cyclic redundancy check (CRC) to verify the integrity of the received data. Unframed audio data is passed directly from the frame receiver 860 to the FIFO buffer 870. Audio data extraction from the FIFO starts immediately since there is no threshold level set in the buffer at the receiver. This ensures that near-zero receiver latency is achieved. The audio data frames contain a cyclic redundancy check word (CRC). The CRC algorithm, check word location and scope are as defined in IEEE802.3-2000 section 3.2.8. This 32-bit check word will generally detect any error within the frame. In known Ethernet systems a CRC is performed on each frame both at the transmitter and at the receiver. At the receiver complete frames are output only once the result of the CRC on that frame is determined. This results in substantial latency before the data is output at the receiver in known systems. According to the present technique, although the CRC check is still performed at the receiver, data is output from the buffer before the result of the CRC check is obtained. Error control is performed by decoding parity bits at a stage subsequent to data output at the receiver FIFO. In particular, error control is performed when data is extracted from the 32-bit data blocks prior to output as a 32 DSD channel audio stream. Unlike standard Ethernet systems, the MAC-DSD protocol according to the present technique does not support frame re-transmissions in case of an error, as this would require buffering of at least two 125 microsecond audio frames, increasing system latency to an unacceptable degree. Although the primary purpose of the IEEE802.3 CRC is to detect frame errors and thereby generate a retransmission request, the CRC is included for sake of compatibility. It will be appreciated that support for CRC-initiated MAC-DSD frame retransmission may be provided for applications requiring greater robustness at the expense of latency.

Audio data is extracted from the FIFO at a continuous rate of 90.3168 Mbit/s and because the data output rate is less than the data input rate, the FIFO gradually fills up as the frame is received. Once a complete frame has been received there will be an inter-frame latency time before reception of audio data from the next frame and the FIFO buffer will continue to empty (although not completely) during this idle period.

In the event that the receiver buffer fills completely or empties completely an error signal will be sent to the system controller. In this event the system controller will mute the audio outputs because a completely full or empty buffer indicates that one of the following situations has arisen: data link has failed; transmitter has failed; or DSD master clocks have not been properly synchronised between transmitter and receiver.

FIG. 16 schematically illustrates the data structure of a standard Ethernet frame. The frame structure is defined in the IEEE 802.3 standard. As shown in FIG. 16 the Ethernet frame comprises a preamble, a start frame delimiter, a destination address field, a source address field, a data length field, a data payload and a checksum.

The preamble is 7 bytes long, each byte containing the bit pattern 10101010 and this is followed by a single-byte start frame delimiter S containing the bit pattern 10101011. The preamble and start frame delimiter are used for hardware timing purposes. The destination address field is 6 bytes long and specifies the physical address of the network adapter that is to receive the frame. The source address field is 6 bytes long and contains the physical address of the network adapter that is sending the frame. The data length field is 2 bytes long and specifies the size of the data payload. The data payload is a variable length field which is a minimum of 46 bytes and a maximum of 1500 bytes long. The checksum field is 4 bytes long and contains a checksum value for the frame that is used to perform a cyclic redundancy check (CRC). The CRC is a common means of verifying data transmissions. The sending network node calculates a CRC value for the frame according to a predetermined algorithm and encodes it in the frame. The receiving network node then recalculates the CRC and checks the CRC field to see if the values calculated by the transmitter and the receiver match. If the values do not match this indicates that data has been lost or corrupted during transmission. This Ethernet frame will be passed to the Physical layer components where it will be converted to a bit stream and sent across the transmission medium. Note that slight variations of this Ethernet frame format exist.

FIG. 17 shows the structure of an audio data frame according to an embodiment of the present invention. The audio data frame has a total size of 1536 bytes comprising: an 8 byte preamble (following which the physical layer will accept up to 1528 bytes of arbitrary data); a 6-byte field reserved for the destination MAC address (default value 0xffffff); a 6 byte field reserved for the source MAC address (default value 0x000000); a 2-byte data length field which specifies the number of bytes (always 1510 bytes) following this field but excluding the CRC; a 28-byte field reserved for networking headers; a 12-bit reserved field (as yet unallocated); a 4-bit frame type field which is used for example for synchronisation purposes; an audio data payload of 1480 bytes which holds 370 samples of 32 channel DSD audio; and a 4-byte CRC field containing a checksum. The CRC checksum procedure used in embodiments of the invention will be described below. The audio data frame structure illustrated in FIG. 17 is of a form that allows for compatibility with Internet Protocol (IP) networks. Accordingly the audio data frame may be treated as a User Datagram Protocol (UDP)/IP datagram for transmission over wider IP networks. UDP is a connectionless (best try) transport layer protocol. In this particular embodiment only the physical layer is used. The MAC layer is not used so the MAC address fields are not actually required by the system. These fields are simply reserved and filled with default values to allow (potential later) compatibility with Local Area Networks (LAN) or UDP/IP.

The audio frame CRC validity check will now be described in more detail. All frames use a 4-byte CRC check word, to verify the validity of the frame. The CRC algorithm, check word location and scope are similar to those defined in the standards document IEEE802.3-2000 section 3.2.8.

According to the IEEE802.3 standard, the payload of a frame should not be passed on from the data link layer until the frame validity has been verified with the CRC. However, in the context of embodiments of the invention, this implies that the receiver would have to buffer an entire frame before starting to output the DSD audio bitstreams. Direct implementation of this standard would be undesirable, as it would increase the audio latency by 115 µs, from around 25 µs to 140 µs.

The CRC is primarily used to check the validity of a data link between audio devices at system start-up. Link failures after start-up, such as a cable disconnection are indicated by a receiver error assertion from the PHY device, following which the audio output is muted. Since the link is a simple point-to-point connection, with deterministic, synchronised frame transmission and no collisions, other modes of failure are unlikely.

Accordingly, a relatively simple CRC check is implemented in embodiments of the invention: The receiver audio outputs are muted on start-up, until the first received frame has been received in full and verified by its CRC. If the CRC check fails, the audio outputs remain muted, and an error condition indicated to the local system controller. Following the verification of the first frame, the CRC is only be checked retrospectively. This allows audio data to be streamed out with near-zero receiver latency. The CRC is used only to alert a host processor that a CRC error has occurred.

If an invalid audio data frame is encountered, it is theoretically possible for up to 131 µs of invalid audio data to pass, before the output is muted in response to the retrospective CRC test. However, in practice, a random external perturbation that corrupts PHY line symbols will cause invalid symbols, resulting in rapid assertion of a receiver error condition, which may be detected to mute the audio outputs.

If use of a CRC check on every frame is considered necessary then each frame is buffered and verified using the CRC before outputting the DSD audio data. This is not a preferred option because it adds approximately 115 µs extra latency and substantially increases the receiver buffer hardware size.

The 1536-byte audio data frames illustrated in FIG. 17 each have a transmit duration of 120.9 µs (at a symbol rate of 101.6064 Mbit/s). According to a particular embodiment of the invention, frames are transmitted at intervals of 131.1 µs. A minimum inter-frame time of 96 bit periods is provided which leaves 8.25 µs of "link-time" between transmission of audio frames. This link-time is used to convey auxiliary frames containing control data. The maximum total size of a control data frame in this embodiment is 104 bytes.

The structure of a control data frame is identical to that of the audio data frame shown in FIG. 15, with the exception of the length of the data payload which is 1480 bytes for the audio data frame but only 48 bytes for the control data frame. A control data frame is transmitted every 131 µs, which provides a control data bandwidth of 2.9 Mbit/s. The control data itself may comprise channel usage information, router control data and clock source control data. The control data will be transmitted from storage in a FIFO buffer at the transmitter and gathered in a FIFO buffer at the receiver before being routed to a system controller of the receiver.

FIG. 18A shows the audio data frame format for the 32 DSD channel embodiment which is arranged as 384*4-byte data words. Similarly, FIG. 19 shows the control data format for the 32 channel DSD embodiment arranged as 26*4-byte data words. In both FIG. 18A and FIG. 19, bit zero (B0) is transmitted first and bit 31 (B31) is transmitted last. These audio data frames and control data frames are passed to and received from the Media Independent Interface (MII) connection 218 that provides a link to the Ethernet physical layer devices. The MII comprises a 4-bit wide transmit data bus and a 4-bit wide receive data bus each of which is clocked from the PHY at the link rate of 25 MHz (or 25.4016 MHz). The MII also has a transmit-enable signal input to initiate data transmission and a receive data valid signal output as well as other error and signal status indicators.

Referring now to the audio data frame structure illustrated in FIG. 18A it can be seen that the payload of the audio data frame contains 370 samples of 32-channel 64Fs DSD audio. These channels are multiplexed per-bit. Each 32-bit word represents one 64Fs DSD sample for 32 audio channels. Word 13 is the first DSD sample in the frame, and word 382 is the last. Bit 0 of an audio data word is always the single-bit sample data for channel 1 (the first channel in the system) whereas Bit 31 of an audio data word is always the single-bit sample data for channel 32 (the last channel in the system). Table 3 below indicates how successive samples for each channel are stored in the data words of the audio frame. For example: bit 0 of word 13 is the channel 1 sample data, for the first DSD sample in the frame; bit 6 of word 14 is the channel 7 sample data, for the second DSD sample in the frame; and bit 31 of word 382 is the channel 32 sample data, for the last DSD sample in the frame.

TABLE 3

| Word | Bit 31 | Bit 30 | ... | Bit 1 | Bit 0 |
|---|---|---|---|---|---|
| 13 | Ch. 32, sample 1 | Ch. 31, sample 1 | ... | Ch. 2, sample 1 | Ch. 1, sample 1 |
| 14 | Ch. 32, sample 2 | Ch. 31, sample 2 | ... | Ch. 2, sample 2 | Ch. 1, sample 2 |
| . . | . | . | | . | . |
| . . | . | . | | . | . |
| 382 | Ch. 32, sample 370 | Ch. 31, sample 370 | ... | Ch. 2, sample 370 | Ch. 1, sample 370 |

Although Table 3 above represents the frame format in 32-bits words, these are supplied to and from MII four bits (a nibble) at a time rather than a word (4-bytes) at a time. The sequence of nibbles supplied to the MII for the single 24 DSD channel frame of FIG. 18B is as shown in Table 4 below. The start of the 14$^{th}$ data 4-byte word (word 13) corresponds to the start of the 105$^{th}$ 4-bit nibble (nibble 104). The column headings TXD and RXD in the table below refer to the MII transmit and receive data buses respectively, which transfer nibbles of data synchronously with a 25 MHz (or 25.4016 MHz) clock.

Nibble 0 is the first nibble in the frame, and contains part of the preamble pattern (0x5). Nibble 104 is the first nibble of the audio data field (first nibble of word 13), and nibble 3063 is the last nibble of the audio data field (last nibble of word 382).

TABLE 4A

| nibble | TXD(3)/ RXD(3) | TXD(2)/ RXD(2) | TXD(1)/ RXD(1) | TXD(0)/ RXD(0) |
|---|---|---|---|---|
| 0 | 0 | 1 | 0 | 1 |
| 1 | 0 | 1 | 0 | 1 |
| . . | . | . | . | . |
| . . | . | . | . | . |
| 104 | channel 4 sample 1 | channel 3 sample 1 | Channel 2 sample 1 | channel 1 sample 1 |
| 105 | channel 8 sample 1 | channel 7 sample 1 | Channel 6 sample 1 | channel 5 sample 1 |
| 106 | channel 12 sample 1 | channel 11 sample 1 | Channel 10 sample 1 | channel 9 sample 1 |
| . . | . | . | . | . |
| 111 | channel 32 sample 1 | channel 31 sample 1 | Channel 30 sample 1 | channel 29 sample 1 |

TABLE 4A-continued

| nibble | TXD(3)/ RXD(3) | TXD(2)/ RXD(2) | TXD(1)/ RXD(1) | TXD(0)/ RXD(0) |
|---|---|---|---|---|
| 112 | channel 4 sample 2 | channel 3 sample 2 | Channel 2 sample 2 | channel 1 sample 2 |
| . . | . | . | . | . |
| . . | . | . | . | . |
| 3062 | channel 28 sample 370 | channel 27 sample 370 | Channel 26 sample 370 | channel 25 sample 370 |
| 3063 | channel 32 sample 370 | channel 31 sample 370 | Channel 30 sample 370 | channel 29 sample 370 |

FIG. 18B schematically illustrates the audio data frame format for the 24 DSD channel embodiment. In this case the frame comprises 368*4-byte data words. The payload of the audio data frame comprises 352 DSD samples, each sample comprising 1-bit from each of the 24 channels. Data words 15 to 366 contain the audio data payload. Words 2 to 4 are reserved for source and destination MAC addresses. Bits 0 to 15 of word 5 specifies the total number of bytes in the frame from the beginning of the length field onwards but excluding the CRC field, which in this case is 1446 bytes. Bits 16 to 31 of word 5, words 6 to 12 and bits 0 to 15 of word 13 are data fields reserved for UDP and IP parameters. These data fields facilitate optional use of UDP/IP. When UDP/IP operation is not required, the transmitter fills these fields with zeros. The receiver may ignore all these UDP/IP header fields, with the exception of the first four bits (bits 16 to 19 of word 5 in this case) which indicate the IP Version. The data entry in the IP version field is checked and an action is taken in correspondence with the determined value as specified in Table 5 below:

TABLE 5

| IP Header Value | Consequent Action |
|---|---|
| 0x0 | Process frame as normal (i.e. transmitter did not fill IP fields) |
| 0x4 | Process frame as normal (i.e. transmitter filled frame header fields according to IP version 4) |
| any other | Discard the frame |

The IP Version check is performed to ensure backwards compatibility of the current IP version 4 from future IP versions (i.e. IP version 6). Future IP versions may have different header lengths, and consequently the Frame Format ID fields may be located at a different position in the frame. The safeguard of checking the IP version field checking means that such a frame would be discarded by the receiver (due to having a value other than 0x0 or 0x4) which avoids the possibility of the frame being incorrectly interpreted due to the Frame Format ID fields not being in the expected location at words 13 and 14.

Bits 16 to 31 of word 13 and bits 0 to 31 word 14 in FIG. 18B are fields for specifying the MAC-DSD frame format. This 48-bit frame format field is logically divided into three distinct 16-bit (4-nibble) sections, each of which contains an identical set of frame format data on transmission. The same set of frame format data is repeated three times within a given frame to ensure that the frame format identifier is robust to transmission errors i.e. multiple copies of the data are sent to serve as an error protection mechanism. This data-repeat error protection mechanism has the advantage that it gives the required error correction capability given that 48 bits are available to convey 16 bits of information yet it is simple to implement. An alternative embodiment might use an error correction code such as a convolutional code to transmit the frame format ID payload.

Each of the three 16-bit frame format field sections are structured as illustrated in FIG. 20. The first nibble (bits 0-3) of each 16-bit section specifies the Protocol Minor Version (OxO-Oxf). The protocol minor Version field is used to indicate minor updates to the protocol specification. A more recent Minor Version should be fully backwards-compatible with a previous Minor Version associated with the same Major Version so that for example a Version 1.7 protocol must incorporate all the functionality of Version 1.6 protocol, and a Version 1.7 transceiver must be able to communicate fully with a Version 1.6 transceiver. The second nibble (bits 4-7) of each 16-bit section specifies the Protocol Major Version (OxO-Oxf). This field is used to indicate major updates to the protocol specification. Backwards-compatibility with previous Major Versions of the protocol is desirable but not mandatory. The third nibble (bits 8-11) of each 16-bit section specifies the Frame Type (OxO-Oxi). This field can be used to indicate different frame types used by a given version of the protocol. Within a given Major Version level, the definitions of frame types should be consistent. The basic type of audio frame is always Type 0. The table below specifies the information derivable from the Frame type number specified by bits 8 to 11 according to the described embodiment.

| Frame Type Number | Name | Description |
| --- | --- | --- |
| 0x0 | DSD audio frame | 352 DSD (2.8224 MHz) samples, 24-channel, plus 88 bytes aux data, (32, 26) Hamming linear block code error correction, 256-nibble interleaving |
| other | (invalid) | Invalid - reject frame |

The fourth nibble (bits 12-15) of each 16-bit section contains one or more flags used for example to flag frames for synchronisation purposes as described above with reference to the flow chart of FIG. 13. The definition of the flag bits is dependent upon the Major Version protocol level. The table below specifies the information derivable from the frame flag bits 12-15 according to the described embodiment. In particular bit 0 of the flags field is the 44.1 kHzsync flag. If flag 0 has a value 1 this indicates that the first DSD sample in frame was received at transmitter simultaneously with 44.1 kHz sync clock positive edge whereas if bit 0 of the flags field has value 0, this indicates that the first DSD sample in frame was not received at transmitter simultaneously with 44.1 kHz sync clock positive edge.

| Flag bit | Name | Description |
| --- | --- | --- |
| 0 | 44.1 kHz sync flag | 1: First DSD sample in frame was received at transmitter simultaneously with 44.1 kHz sync clock positive edge<br>0: First DSD sample in frame was not received at transmitter simultaneously with 44.1 kHz sync clock positive edge |
| others | (not used) | Set to 0 by transmitter, ignored by receiver |

FIG. 21 schematically illustrates the three 4-nibble sections of the frame format ID containing a set of data entries to be processed at the receiver. Section 0 comprises nibble 0 (n0) to nibble 3 (n4), section 1 comprises nibble 4 (n4) to nibble 7 (n7) and section 2 comprises nibble 8 (n8) to nibble 11 (n11). The manner in which the repetition of data sections is used at the receiver to reject data transmission errors will now be explained in the context of FIG. 21. According to the present technique it is known that on transmission, each of the three sections should contain an identical data set such that data entries in corresponding nibble positions of each of the three sections match. On particular it is expected that: n0=n4=n8; n1=n5=n9; n2=n6=n10; and n3=n7=n11. At the receiver triplets of corresponding nibbles are compared for equality, and a majority decision is taken as to the correct data value. Consider the example incoming receiver data set shown in FIG. 21. For the first triplet of nibbles it can be seen that n0=1101b, n4=1101b, n8=1101b i.e. the corresponding nibble values are identical so the value is assumed to be correct and the first nibble of the Frame Format, which specifies the protocol minor version, is set to the value 1101b. Similarly, for the second triplet of nibbles n1=n5=n9=1110b so the value is assumed to be correct and the second nibble of the Frame Format, which specifies the protocol major version, is set to 1110b. However, for the third triplet of nibbles there is a discrepancy between the data values since n2=n10=0110b but n6=1011b. In this case n6 is rejected as being erroneous on the basis of a majority decision so that the receiver and outputs the third nibble of the Frame Format, which corresponds to the frame type, as 0110b. For the fourth and final triplet of nibbles it can be seen from FIG. 21 that none of the corresponding nibbles match n3=0010b, n7=0111b, n11=1100b. In this case a majority decision is impossible so the frame format cannot be determined and consequently the frame is rejected.

An alternative embodiment uses a modified Frame Format error detection/correction strategy. This alternative strategy also involves using the data repetition and majority decision approach but the strategy is augmented by using a 100Base-TX PHY 'MII receive error' (rx_er) signal to flag nibbles that are known to be in error. For example consider receiving the following values for the fourth triplet of nibbles with associated error flags as indicated: n3=1000b (rx_er=true), n7=0100b (rx_er=false), n11=1000b (rx_er=true). In this case, although the majority decision determines that 1000b is the correct value, the rx_er signal indicates that n3 and n11 are definitely incorrect. Thus according to this alternative strategy the data vale n7 is selected in preference to n7 and n11 to give a Frame Format Flags value of 0100b.

Returning now to the frame data fields of FIG. 18B, the last word (word 367) of the 24 DSD channel data frame is a field containing cyclic redundancy check (CRC) data.

Table 4B below identifies the sequence of nibbles supplied to the MII for the single 24 DSD channel frame of FIG. 18B. This sequence is transmitted via the nibble-wide MII interface 218, starting with the least significant nibble. Nibbles 0 to 8 (32 bits) correspond to word 0 of FIG. 18B, nibbles 8 to 15 correspond to word 1 of FIG. 18B, nibbles 16 to 23 correspond to word 2 of FIG. 18B and so on until the last nibble which corresponds to bits 28 to 31 of word 366. There are a total of 2936 nibbles (367 words) corresponding to the 1446 byte frame of FIG. 18B since the last word is not transmitted as a nibbles. As mentioned above with reference to FIG. 1 the MII 218 interface provides independent 4-bit wide data-transmit and data-receive paths and full duplex operation. More particularly, the MII 218 comprises: a four-bit wide transmit data bus, clocked from the physical layer interface (PHY) 514, 526 at the link rate (25 MHz or 25.4016 MHz); a transmit enable signal input; four-bit (nibble) wide receive data bus, clocked from the PHY at the link rate (25 MHz or 25.4016 MHz); a receive data valid signal output; and error and signal status indicators. A full description of the MII interface, can be found in IEEE802.3-2000 Section 22, but note that the clock rate according to the present technique may be 25.4016 MHz rather than the IEEE standardised 25.0000 MHz.

TABLE 4B

| Nibble | Word (from FIG. 18B) | MII TXD(3) | MII TXD(2) | MII TXD(1) | MII TXD(0) |
|---|---|---|---|---|---|
| 0 | 0 | Bit 3 | Bit 2 | Bit 1 | Bit 0 |
| 1 | 0 | Bit 7 | Bit 6 | Bit 5 | Bit 4 |
| . | . | . | . | . | . |
| . | . | . | . | . | . |
| . | . | . | . | . | . |
| 7 | 0 | Bit 31 | Bit 30 | Bit 29 | Bit 28 |
| 8 | 1 | Bit 3 | Bit 2 | Bit 1 | Bit 0 |
| . | . | . | . | . | . |
| . | . | . | . | . | . |
| . | . | . | . | . | . |
| 2934 | 366 | Bit 27 | Bit 26 | Bit 25 | Bit 24 |
| 2935 | 366 | Bit 31 | Bit 30 | Bit 29 | Bit 28 |

The nibble is the fundamental unit of data carried on the physical layer. Each 4-bit nibble is mapped to a 5-bit symbol by the PHY 514, 526, for transmission on the signal line 515. All frames for transmission must begin with an eight-byte preamble pattern, following which the physical layer will accept up to 1528 bytes of arbitrary data, supplied 4 bits at a time. Received frames are supplied 4 bits at a time by the receive bus, including the preamble.

The 24 DSD channel frame format of FIG. 18B includes a frame payload of 352 DSD samples, each of which consists of a 32-bit data block. FIG. 22 schematically illustrates the format of the 32-bit data block. Each data block corresponds to a single DSD sample period of approximately 354 ns. The data block comprises a 24-bit audio data vector each bit of which belongs to a respective one of the 24 audio channels, 2 bits of auxiliary data and 6 check (or parity) bits. As shown in FIG. 22 bit numbers 0 to 14 contain bits 1 to 15 of the audio data vector, bit numbers 15, 23, 27,29,30 and 31 contain the six parity bits, bit numbers 26 and 28 contain the two bits of auxiliary data and the remaining nine bits of the audio vector are contained sequentially in bit numbers 16 to 22, 24 and 25 of the data block.

The six parity bits of the 32-bit data block provide error control capability. The 24-bits of audio data plus the two auxiliary bits (totalling 26 bits) are encoded using a type of linear block code known as a Hamming code. In this case a (31, 26) Hamming code is used, which means that 5 (=31−26) parity bits are generated by the code for each group of 26 data bits. The final bit of the 32-bit block is a global parity bit so there are a total of 6 parity bits and 26 data bits. The (31, 26) Hamming code is capable to detecting 2 errors per data block but is only capable of correcting one error per data block.

FIG. 23A schematically illustrates how the six parity bits P0 to P5 are generated from the 24 audio data bits (numbered 1-24) and the two auxiliary data bits A0, A1. Parity bits P0 to P5 are generated by performing a logical XNOR operation on a predetermined sequence of 15 data elements. For example P0 is generated by performing an XNOR operation on audio vector bits 1 through 15 whereas P1 is generated by performing an XNOR operation on audio vector bits 1 to 8 and 16 to 22. Global parity bit P5 is obtained by performing the XNOR operation on all 26 data elements. The error detection process at the receiver involves determining whether the parity checks are satisfied in the received data sequence. This is done using a value known as the syndrome. The syndrome is obtained by comparing the received parity bits and the parity bits recalculated from the received information. FIG. 23B indicates how the syndrome s is generated by XNOR operations on various combinations of the received data block elements. Table 6 below indicates how the value of the syndrome is used to detect and correct errors in the received data block. Essentially, if all 6 bits of the syndrome have value 1 (s=111111) then the received data sequence is assumed to be correct. If the sixth bit of the syndrome is zero then there is assumed to be a single error in the received data block, which is correctable by inverting the appropriate bit. The appropriate bit is identified from the value of the syndrome itself e.g. if s=011011 in binary notation, which corresponds to the decimal number 27 then it is determined that bit number 27 (of bits 0 to 31) should be inverted to correct the data block. If the sixth bit of the syndrome is 1 but the other five bits are not all 1 e.g. s=111011 then this indicates that there are two or more errors in the block and the multiple errors are uncorrectable.

TABLE 6

| $s_5$ | $s_4s_3s_2s_1s_0$ | Block status |
|---|---|---|
| 1 | 11111 | No errors in block |
| 0 | other | One error in block, identified by $s_4s_3s_2s_1s_0$ - correct error by inverting bit |
| 1 | other | More than one error in block - not correctable |

The 32-bit data blocks (see FIG. 22) are interleaved in groups of 32, to facilitate correction of groups of errors. The interleaving process involves permuting the data in a predetermined way. This is required because the (31, 26) Hamming code used for each 32-bit data block is only capable of correcting a single bit error in a given block. Since the fundamental unit of data on the physical layer the four-bit data nibble, a single instantaneous corruption on the physical layer will cause a symbol error (recall that a symbol is a 5-bit quantity), resulting in four consecutive bit errors. To facilitate correction of such 4-bit burst errors the erroneous bits must be distributed amongst four different 32-bit data blocks.

Consider a stream of 352 32-bit data blocks B0, B1, B2, . . . B351 emerging from the parity generator for transmission. Recall that the 24 DSD channel frame of FIG. 18B comprises an audio data payload of 352 32-bit data blocks. The resulting stream of nibbles from the interleaver is comprised as shown in FIG. 24. In this Figure the bits of the audio payload are labelled such that B2[0] refers to bit 0 of block 2, for example. Thus it can be seen that nibble zero comprises bit 0 of blocks 0, 1, 2 and 3 respectively; nibble 1 comprises bit 0 of blocks 4, 5, 6 and 7 respectively and so on. Accordingly, nibbles 0 to 7 collectively comprise bit 0 of each of the thirty-two 32-bit data blocks, nibbles 8 to 15 collectively comprise bit 1 of each of the thirty-two 32-bit data blocks and nibbles 2802 to 815 comprise bit 31 of each of the thirty-two 32-bit data blocks. The 32-block interleaving system used by MAC-DSD facilitates the correction of up to eight symbol errors (i.e. 32 bits can be corrected overall) in a group of 32 interleaved data blocks (256 nibbles or symbols).

In summary, the version of the MAC-DSD protocol used for transmission of 24 DSD channels as described above with reference to FIGS. 18B and 20 to 23 has key features including: 24-channel, full-duplex transfer of 2.8224 MHz DSD audio; 100Base-TX physical layer; audio latency of less than 50 microseconds; Hamming linear block code error correction, with 256-nibble interleaving, to correct up to 8 nibble errors per 256-nibble block group; 64 fs DSD clock transfer in both directions; and frame flag indication for transfer of the 44.1 kHz sync signal.

FIG. 25 schematically illustrates the protocol layers of the MAC-DSD protocol for the particular example embodiment using the 24 DSD channel frame format. On the transmitter side 1000 the protocol layers comprise a parity generating and formatting layer 1010 that receives the incoming 24 channel DSD audio stream and an auxiliary data stream of up to 5.6 Mbit/s. This layer 1010 generates six parity bits for each 24 audio bit and 2 auxiliary bit sample and formats the resulting 32-bit data block. The 32-bit data blocks output by the parity generating and formatting layer 1010 are supplied to an interleaving layer 1020 that interleaves the data blocks in groups of 32 and outputs the interleaved data across the MII 218 in 4-bit nibbles as specified in FIG. 24. The nibbles of data from the interleaver are supplied to the FIFO buffer 810 of the transmitter at a continuous data rate of 90.3168 Mbit/s. The nibbles continue to fill the FIFO buffer 810 until the predetermined threshold buffer occupation level is reached (as described with reference to FIG. 14) whereupon assembly of a data frame begins. During data frame assembly data nibbles are read out of the FIFO buffer 810 and passed to a frame assembly layer 1040. The frame assembly process involves use of a header data generation module 1050 that generates frame header information and a CRC generation module 1060 that generates data for the CRC field, which is word 367 of the frame format of FIG. 18B. The frames are assembled such that they contain a 1408 byte payload of 352 DSD samples contained in 352 32-bit data blocks. Data from the frame assembly layer 1040 is output as MII frames (which comprise nibbles) at a rate of 101.6064 Mbit/sec and supplied to the transmitter physical layer 1070 which prepares the data for transmission across the physical medium. The transmitter physical layer 1070 forms a 5-bit symbol from each 4-bit nibble and the symbols are transmitted to the receiver across a twisted-pair cable. On the receiver side 1100 a receiver physical layer 1110 receives the 5-bit symbols and processes them to form MII frames comprising 4-bit nibbles. The MII frames are supplied to a frame disassembling layer 1120 at a rate of 101.6064 Mbit/sec, where the frames are partially deconstructed. At this stage a CRC checking module 1160 performs CRC checking (although data may be output from the receiver FIFO before the result of the CRC check is available) and a header data module strips off the header data for subsequent processing. The frame payload is output by the frame disassembling layer 1120 as MII nibbles which are fed to the FIFO buffer 870 (as described above with reference to FIG. 15) which has a low latency with regard to data output. Data is output from the FIFO buffer 870 in the form of MII nibbles and passed to a deinterleaving layer 1160. The de-interleaver de-interleaves the data in groups of 32 data blocks to reconstruct individual 32-bit data blocks of the format illustrated in FIG. 22. The 32-bit data blocks are then passed to a parity decoding and data extraction layer 1170 whereupon the parity data is used to perform error control and the recovered payload data is extracted. The output of this layer is a 24 channel DSD audio stream and an auxiliary data stream of up to 5.6 Mbit.s Note that in FIG. 25, although the FIFO buffers 810, 870 do not perform any data translation and therefore are not technically protocol layers, they are included in the schematic illustration of the protocol layer structure for completeness.

Note that in the case of the 352 sample payload of the 24 DSD channel frame format of FIG. 18B, the transmission buffer size and predetermined buffer occupancy threshold differs from the buffer size and occupancy threshold specified in the description of FIG. 14 above for the 370 sample payload of the 32 DSD channel Frame Format of FIG. 18A. In particular, for the 24 DSD channel frame format the minimum buffer size is 36 data blocks (rather than 42 data blocks) and the corresponding minimum occupancy threshold value is 30 data blocks (as before). The audio latency introduced by this buffering is equivalent to 36 DSD samples (rather than 42 samples) or 14.9 microseconds (rather than 12.2 microseconds). In so far as the embodiments of the invention described above are implemented, at least in part, using software-controlled data processing apparatus, it will be appreciated that a computer program providing such software control and a storage or transmission medium by which such a computer program is stored or transmitted are envisaged as aspects of the present invention.

The invention claimed is:

1. A data communication system for communicating an input streamed data signal having an associated clock signal, the system comprising:
    at least two data handling nodes each having a physical layer interface device and a balanced line interface device, a transmitting one of the data handling nodes being arranged to transmit the input data signal to a receiving one of the data handling nodes; and
    a twisted-pair wired connection linking the data handling nodes, the wired connection comprising a cable providing at least two parallel data transmission paths between the data handling nodes;
    in which:
    at the transmitting node, the input data signal is supplied to the physical layer interface device for packeted transmission via one data transmission path of the wired connection to the receiving node; and the clock signal associated with the input data signal is supplied to the balanced line interface device for substantially continuous transmission via another of the data transmission paths to the receiving node; and
    at the receiving node, the received clock signal is supplied to the balanced line interface device for recovery and the packeted data signal is supplied to the physical layer interface device for conversion back to a streamed data signal.

2. A system according to claim 1, in which the data handling nodes comprise means for generating an interface clock signal in dependence on the clock signal associated with the input data signal and for supplying the interface clock signal to control operation of the respective physical layer interface device.

3. A system according to claim 2, in which the interface clock signal has a clock rate which is different to a standard Ethernet clock signal rate.

4. A system according to claim 3, in which the data clock signal and the interface clock signal are respective integer multiples of 2.8224 MHz when expressed to a corresponding accuracy.

5. A system according to claim 3, in which the interface clock signal is 25.4016 MHz when expressed to a corresponding accuracy.

6. A system according to any one of claim 2, in which the generating means is a phase locked loop multiplier.

7. A system according to claim 1, in which one of the data handling nodes is designated as a clock master node, other data handling node(s) being clock slave node(s).

8. A system according to claim 7, in which each clock slave node operates to synchronize a local data clock signal to a data clock signal received from the clock master node.

9. A system according to claim 8, in which:
each clock slave node operates to transmit its local clock signal back to the clock master node; and
the clock master node operates to compare the clock signal received from a clock slave node with its own data clock signal to assess whether the clock slave node is properly synchronize.

10. A system according to claim 1, in which the physical layer interface device is an Ethernet physical layer interface device.

11. A system according to claim 1, in which the transmitting node comprises a filter for filtering the clock signal before transmission via one of the transmission paths.

12. A system according to claim 11, in which the filter comprises a low pass filter.

13. A system according to claim 1, in which the receiving node comprises a filter for filtering the clock signal received via one of the transmission paths.

14. A system according to claim 13, in which the filter comprises a high pass filter and a low pass filter, the output of the high pass filter forming an input to the low pass filter.

15. A system according to claim 1,
the transmission node having:
a frame assembly arrangement operates to receive the input data signal at an input data rate and to buffer the input data signal prior to performing a frame assembly operation in which buffered data is retrieved and assembled to form framed data including discrete data frames having a predetermined frame size, the frame assembly arrangement being operable to output the framed data for transmission at a framed data rate;
and the receiving node having:
a frame receiving arrangement operable to receive framed data from the transmission node at the framed data rate and to buffer the received framed data prior to performing frame disassembly to produce blocked data including a sequence of data blocks at an output data rate;
in which output of framed data is commenced by the frame assembly arrangement prior to assembly of a complete frame and output of data blocks is commenced by the frame receiving arrangement prior to disassembly of a complete frame of received framed data.

16. A data communication system for communicating an input streamed data signal having an associated data clock signal, the system comprising:
at least two data handling nodes each having a physical layer interface device operating in dependence on an interface clock signal, a transmitting one of the data handling nodes being arranged to transmit the input data signal to a receiving one of the data handling nodes; and
a wired connection linking the data handling nodes, the wired connection comprising a cable providing at least two parallel data transmission paths between the data handling nodes;
in which:
the data handling nodes comprise means for generating an interface clock signal in dependence on the data clock signal and for supplying the interface clock signal to the respective physical layer interface device; and
at the transmitting node, the input data signal is supplied to the physical layer interface device for packeted transmission via one data transmission path of the wired connection to the receiving node; and the clock signal associated with the input data signal is substantially continuously transmitted via another of the data transmission paths to the receiving node.

17. A system according to claim 16, in which the wired connection comprises two or more twisted pair connections.

18. A system according to claim 16, in which the wired connection comprises two or more unscreened twisted pair connections.

19. A system according to claim 18, in which the wired connection comprises an ISO category 5, category 5e or category 6 data communications cable.

20. A system according to claim 16, in which the interface clock signal has a clock rate which is different to a standard Ethernet clock signal rate.

21. A system according to claim 16, in which the generating means is a phase locked loop multiplier.

22. A system according to claim 16, in which one of the data handling nodes is designated as a clock master node, other data handling node(s) being clock slave node(s).

23. A system according to claim 16, in which the physical layer interface device is an Ethernet physical layer interface device.

24. A system according to claim 16, in which the transmitting node comprises a filter for filtering the clock signal before transmission via one of the transmission paths.

25. A system according to claim 16, in which the receiving node comprises a filter for filtering the clock signal received via one of the transmission paths.

26. A system according to claim 16,
the transmission node having:
a frame assembly arrangement operates to receive the input data signal at an input data rate and to buffer the input data signal prior to performing a frame assembly operation in which buffered data is retrieved and assembled to form framed data consisting of discrete data frames having a predetermined frame size, the frame assembly arrangement being operates to output the framed data for transmission at a framed data rate;
and the receiving node having:
a frame receiving arrangement operates to receive framed data from the transmission node at the framed data rate and to buffer the received framed data prior to performing frame disassembly to produce blocked data including a sequence of data blocks at an output data rate;
in which output of framed data is commenced by the frame assembly arrangement prior to assembly of a complete frame and output of data blocks is commenced by the frame receiving arrangement prior to disassembly of a complete frame of received framed data.

27. A data transmission node for communicating an input streamed data signal having an associated clock signal to a receiving node via a twisted-pair wired connection linking data handling nodes, the wired connection comprising a cable providing at least two parallel data transmission paths between the data handling nodes; the transmission node comprising:
a physical layer interface device; and
a balanced line interface device;
in which:
the input data signal is supplied to the physical layer interface device for packeted transmission via one data transmission path of the wired connection to the receiving node; and the clock signal associated with the input data signal is supplied to the balanced line interface device for substantially continuous transmission via another of the data transmission paths to the receiving node.

28. A data transmission node for communicating an input streamed data signal having an associated data clock signal to a receiving node via a wired connection linking data handling nodes, the wired connection comprising a cable providing at least two parallel data transmission paths between the data handling nodes; the transmission node comprising:
- a physical layer interface device operating in dependence on an interface clock signal;

in which:
- the transmission node comprises means for generating an interface clock signal in dependence on the data clock signal and for supplying the interface clock signal to the physical layer interface device;
- the input data signal is supplied to the physical layer interface device for packeted transmission via one data transmission path of the wired connection to the receiving node; and
- the clock signal associated with the input data signal is substantially continuously transmitted via another of the data transmission paths to the receiving node.

29. A data receiving node for receiving a data signal having an associated data clock signal from a transmission node via a twisted-pair wired connection linking the data handling nodes, the wired connection comprising a cable providing at least two parallel data transmission paths between the data handling nodes, the data signal representing a packetized version of a streamed data signal, the receiving node comprising:
- a physical layer interface device; and
- a balanced line interface device, in which:
- the received clock signal is supplied to the balanced line interface device for recovery and the packeted data signal is supplied to the physical layer interface device for conversion back to a streamed data signal.

30. A data receiving node for receiving a data signal having an associated data clock signal from a transmission node via a twisted-pair wired connection linking the data handling nodes, the wired connection comprising a cable providing at least two parallel data transmission paths between the data handling nodes, the data signal representing a packetized version of a streamed data signal, the receiving node comprising:
- a physical layer interface device operating in dependence on an interface clock signal;

in which:
- the receiving node comprises means for generating an interface clock signal in dependence on the data clock signal and for supplying the interface clock signal to the physical layer interface device.

31. A method of data communication for communicating an input streamed data signal having an associated clock signal between two data handling nodes via a wired connection linking the data handling nodes, the wired connection comprising a cable providing at least two parallel data transmission paths between the data handling nodes, the data handling nodes each having a physical layer interface device and a balanced line interface device, the method comprising the steps of:
- at the transmitting node, supplying the input data signal to the physical layer interface device for packeted transmission via one data transmission path of the wired connection to the receiving node; and supplying the clock signal associated with the input data signal to the balanced line interface device for substantially continuous transmission via another of the data transmission paths to the receiving node; and
- at the receiving node, supplying the received clock signal to the balanced line interface device for recovery and supplying the packeted data signal to the physical layer interface device for conversion back to a streamed data signal.

32. A method of data communication for communicating an input streamed data signal having an associated clock signal between two data handling nodes via a wired connection linking the data handling nodes, the wired connection comprising a cable providing at least two parallel data transmission paths between the data handling nodes, the data handling nodes each having a physical layer interface device and a balanced line interface device, the method comprising the steps of:
- each node generating an interface clock signal in dependence on the data clock signal; and
- supplying the interface clock signal to the respective physical layer interface device.

33. A method of operation of a data transmission node for communicating an input streamed data signal having an associated clock signal to a receiving node via a twisted-pair wired connection linking the data handling nodes, the wired connection comprising a cable providing at least two parallel data transmission paths between the data handling nodes, the data transmission node comprising a physical layer interface device and a balanced line interface device, the method comprising the steps of:
- supplying the input data signal to the physical layer interface device for packeted transmission via one data transmission path of the wired connection to the receiving node; and
- supplying the clock signal associated with the input data signal to the balanced line interface device for substantially continuous transmission via another of the data transmission paths to the receiving node.

34. A method of operation of a data transmission node for communicating an input streamed data signal having an associated clock signal to a receiving node via a wired connection linking the data handling nodes, the wired connection comprising a cable providing at least two parallel data transmission paths between the data handling nodes, the data transmission node comprising a physical layer interface device and a balanced line interface device, the method comprising the steps of:
- generating an interface clock signal in dependence on the data clock signal and for supplying the interface clock signal to the physical layer interface device;
- supplying the input data signal to the physical layer interface device for packeted transmission via one data transmission path of the wired connection to the receiving node; and
- substantially continuously transmitting the clock signal associated with the input data signal via another of the data transmission paths to the receiving node.

35. A method of operation of a data receiving node for receiving a data signal having an associated data clock signal from a transmission node via a twisted-pair wired connection linking the data handling nodes, the wired connection comprising a cable providing at least two parallel data transmission paths between the data handling nodes, the data signal representing a packetised version of a streamed data signal, the receiving node comprising a physical layer interface device and a balanced line interface device, the method comprising the steps of:
- supplying the received clock signal to the balanced line interface device for recovery; and
- supplying the packeted data signal is supplied to the physical layer interface device for conversion back to a streamed data signal.

36. A method of operation of a data receiving node for receiving a data signal having an associated data clock signal from a transmission node via a wired connection linking the data handling nodes, the wired connection comprising a cable providing at least two parallel data transmission paths between the data handling nodes, the data signal representing a packetized version of a streamed data signal, the receiving node comprising a physical layer interface device operating in response to an interface clock signal, the method comprising the steps of:

generating the interface clock signal in dependence on the data clock signal; and supplying the interface clock signal to the physical layer interface device.

37. A method of data communication for communicating an input data signal using a system comprising a transmission node, a receiving node and a physical layer interface arrangement providing a data connection from the transmission node to the receiver node; the method comprising the steps of:

the transmission node receiving and buffering the input data signal at an input data rate and buffering the input data signal;

the transmission node performing a frame assembly operation in which buffered data is retrieved and assembled to form framed data including discrete data frames having a predetermined frame size;

the transmission node outputting the framed data for transmission at a framed data rate; output of framed data being commenced prior to assembly of a complete frame;

the receiving node receiving and buffering framed data from the transmission node at the framed data rate; and the receiving node performing frame disassembly on the buffered data to produce blocked data including a sequence of data blocks at an output data rate; output of data blocks being commenced prior to disassembly of a complete frame of received framed data.

38. A computer readable storage medium encoded with computer program instructions which cause a computer to implement a method according to claim 31, 32, 33, 34, 35, 36 or 37.

39. A data and clock signal router comprising:

one or more transceivers each comprising a transmitting node according to claim 27 or 28 and a receiving node; and a cross-point switching means for directing the data and clock outputs of the receiving node of a transceiver to the data and clock inputs of the transmitting node(s) of one or more other transceivers.

40. A data communication system for communicating an input data signal, the system comprising a transmission node, a receiving node and an physical layer interface arrangement providing a data connection from the transmission node to the receiver node:

the transmission node having:

a frame assembly arrangement operates to receive the input data signal at an input data rate and to buffer the input data signal prior to performing a frame assembly operation in which buffered data is retrieved and assembled to form framed data including discrete data frames having a predetermined frame size, the frame assembly arrangement being operable to output the framed data for transmission at a framed data rate;

the receiving node having:

a frame receiving arrangement operable to receive framed data from the transmission node at the framed data rate and to buffer the received framed data prior to performing frame disassembly to produce blocked data including a sequence of data blocks at an output data rate;

in which output of framed data is commenced by the frame assembly arrangement prior to assembly of a complete frame and output of data blocks is commenced by the frame receiving arrangement prior to disassembly of a complete frame of received framed data.

41. A system according to claim 40, in which the frame assembly arrangement has a buffer occupation threshold that defines a minimum quantity of input data to be buffered before assembly of a new frame is commenced.

42. A system according to claim 41, in which the frame assembly arrangement commences assembly of header data of a data frame when a quantity of buffered data is greater than or equal to the buffer occupation threshold and then outputs a data payload of the data frame.

43. A system according to claim 41, in which the buffer occupation threshold is set in dependence upon the input data rate, the output data rate and the predetermined frame size.

44. A system according to claim 41, in which the buffer occupation threshold is set such that the buffer contains data from a next frame at a time when a transmission of a current frame ends.

45. A data and clock signal router comprising:

one or more transceivers each comprising a transmitting node and a receiving node according to claim 29; and a cross-point switching means for directing the data and clock outputs of the receiving node of a transceiver to the data and clock inputs of the transmitting node of one or more other transceivers.

* * * * *